(12) United States Patent
Kim et al.

(10) Patent No.: US 6,266,462 B1
(45) Date of Patent: Jul. 24, 2001

(54) ACOUSTO-OPTIC FILTER

(75) Inventors: Byoung Yoon Kim; Seok Hyun Yun; Bong Wan Lee, all of Taejon (KR)

(73) Assignee: Ultraband Fiber Optics, San Jose, CA (US)

( * ) Notice: Subject to any disclaimer, the term of this patent is extended or adjusted under 35 U.S.C. 154(b) by 0 days.

(21) Appl. No.: 09/426,060

(22) Filed: Oct. 22, 1999

Related U.S. Application Data

(63) Continuation-in-part of application No. 09/022,413, filed on Feb. 12, 1998, now Pat. No. 6,021,237.

(51) Int. Cl.[7] .............................. G02F 1/295; H04B 10/00
(52) U.S. Cl. .................. 385/28; 385/15; 385/27; 385/29; 385/37; 385/39; 385/42; 385/43; 385/126; 359/154; 359/180
(58) Field of Search ................... 385/7, 15, 27, 385/28, 29, 39, 42, 47, 31, 123, 126, 127; 359/180, 181, 188, 127, 154, 189, 195

(56) References Cited

U.S. PATENT DOCUMENTS

| | | | |
|---|---|---|---|
| 4,781,425 | * 11/1988 | Risk et al. | 385/28 X |
| 4,828,350 | * 5/1989 | Kim et al. | 385/28 X |
| 4,915,468 | * 4/1990 | Kim et al. | 385/28 X |
| 5,022,732 | * 6/1991 | Engan et al. | 385/28 X |
| 5,708,736 | * 1/1998 | Steinblatt | 385/28 |
| 6,021,237 | * 2/2000 | Kim et al. | 385/28 |
| 6,038,359 | * 3/2000 | Moslehi et al. | 385/28 X |

* cited by examiner

*Primary Examiner*—Brian Healy
(74) *Attorney, Agent, or Firm*—Wilson Sonsini Goodrich & Rosati

(57) ABSTRACT

An acousto-optic filter has a non-birefringent single mode optical fiber with a longitudinal axis, a core and a cladding in a surrounding relationship to the core. The optical fiber has multiple cladding modes and a single core mode that is guided along the core. An acoustic wave propagation member has a proximal end and a distal end coupled to the optical fiber. The acoustic wave propagation member propagates an acoustic wave from the proximal to the distal end and launches a flexural wave in the optical fiber. At least one acoustic wave generator is coupled to the proximal end of the acoustic wave propagation member.

93 Claims, 23 Drawing Sheets

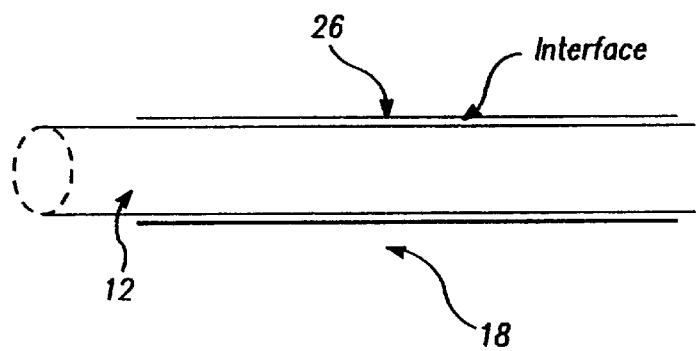
FIG.—3(a)
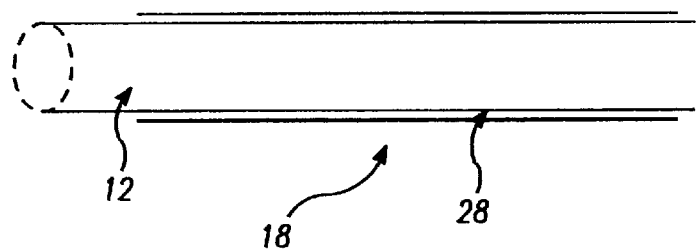
FIG.—3(b)
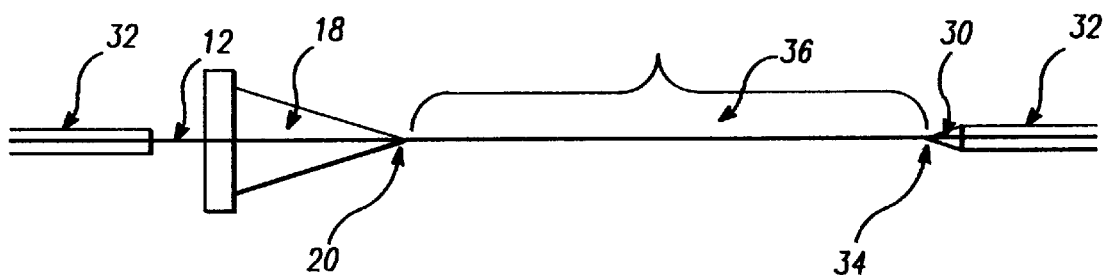
FIG.—4

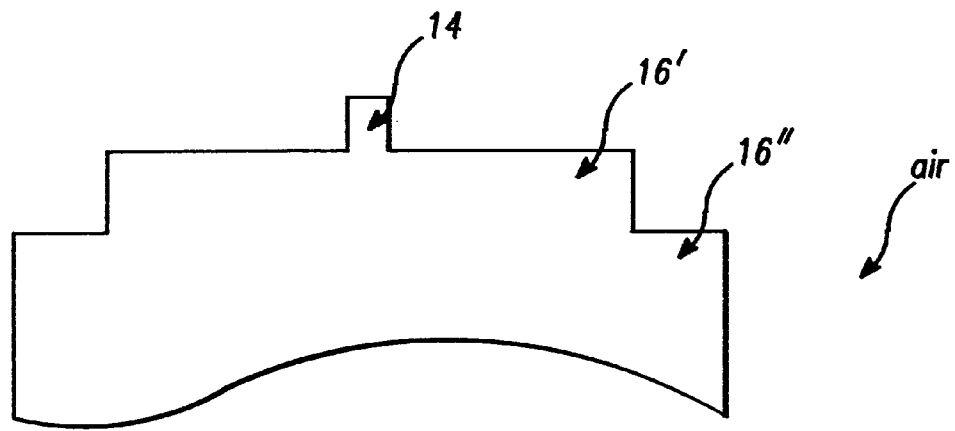
FIG.−5
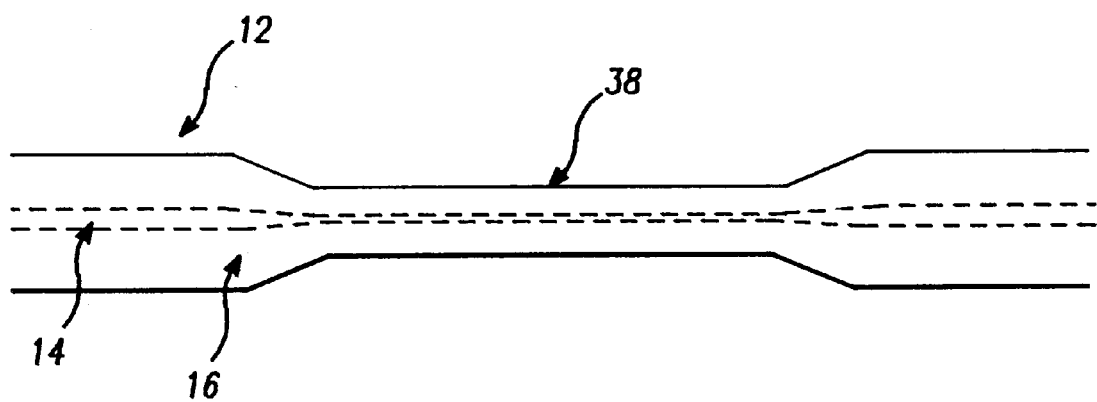
FIG.−6

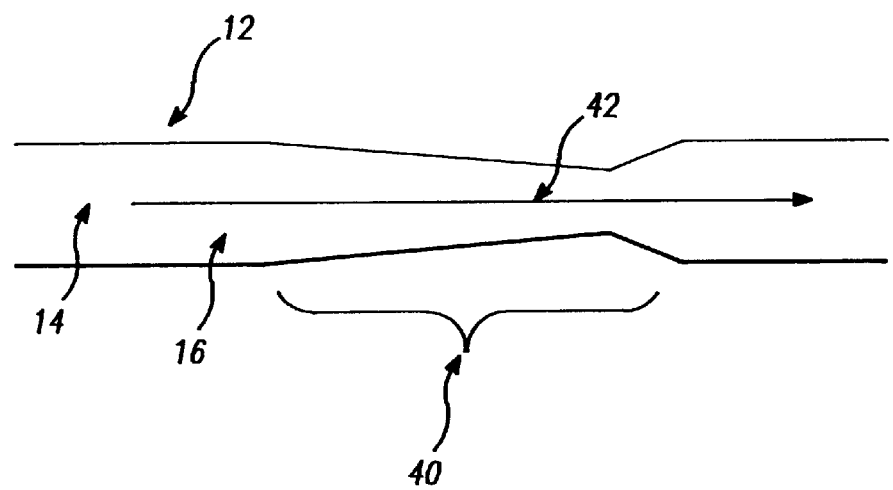
FIG.−7
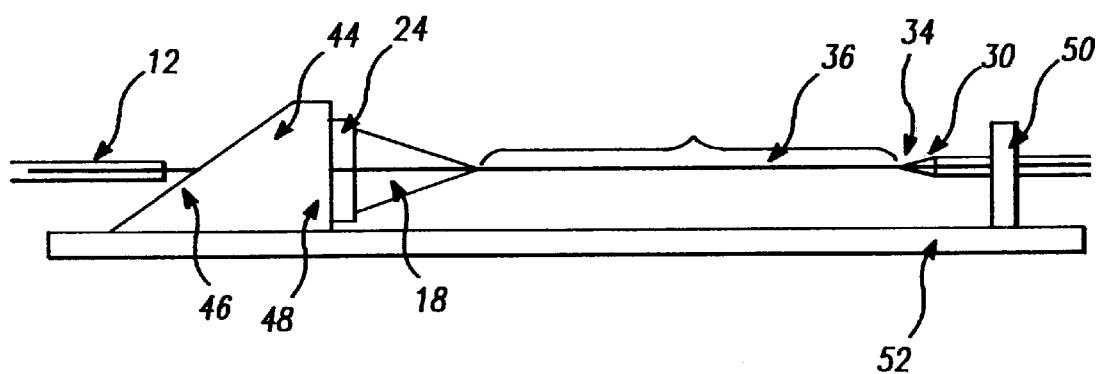
FIG.−8

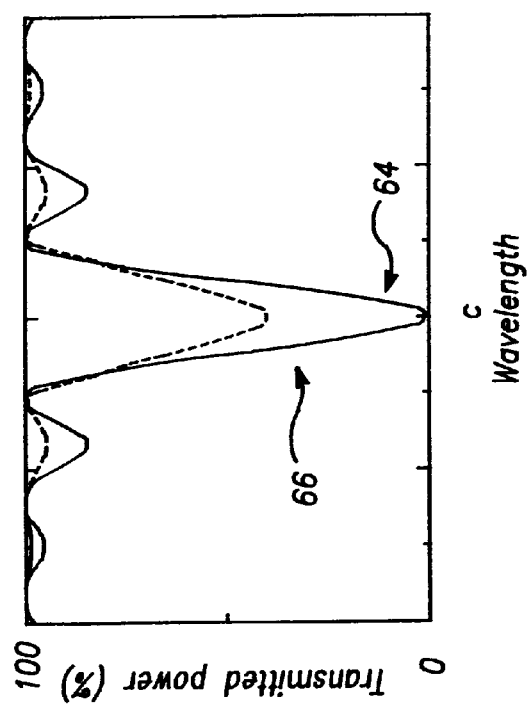
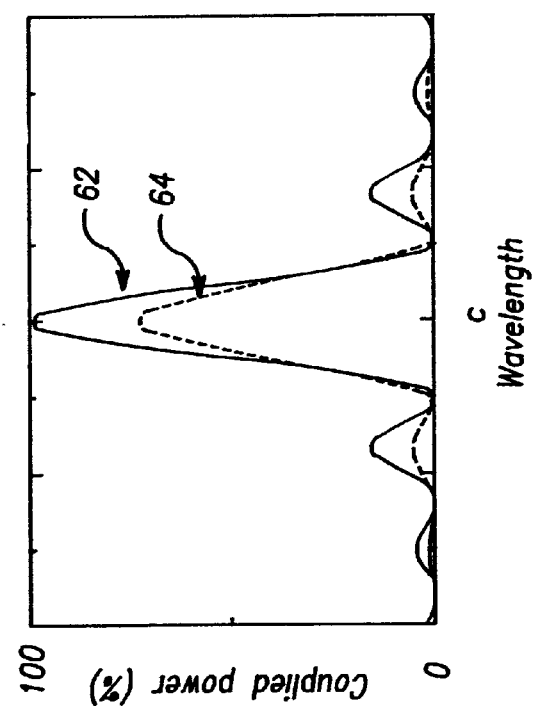
FIG.-12

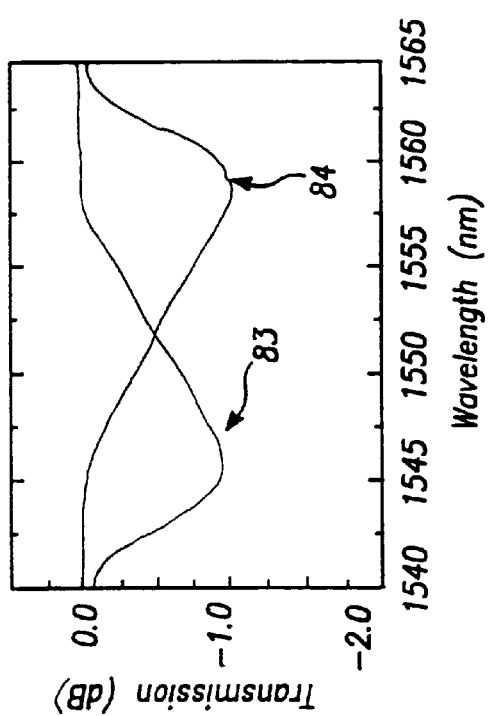
FIG.—16(b)
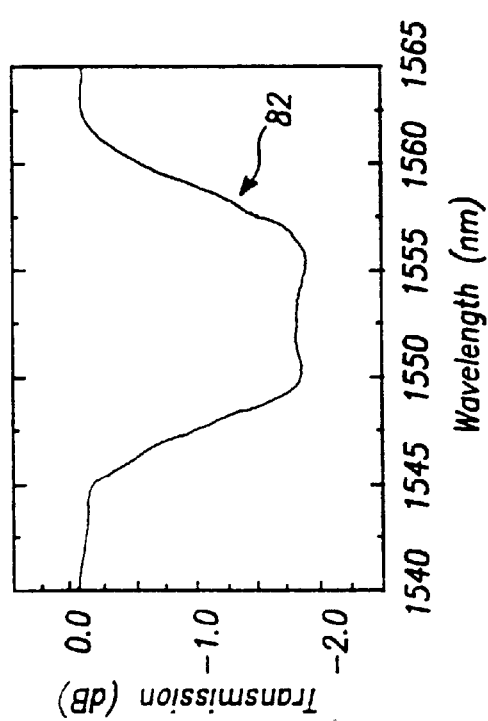
FIG.—16(a)

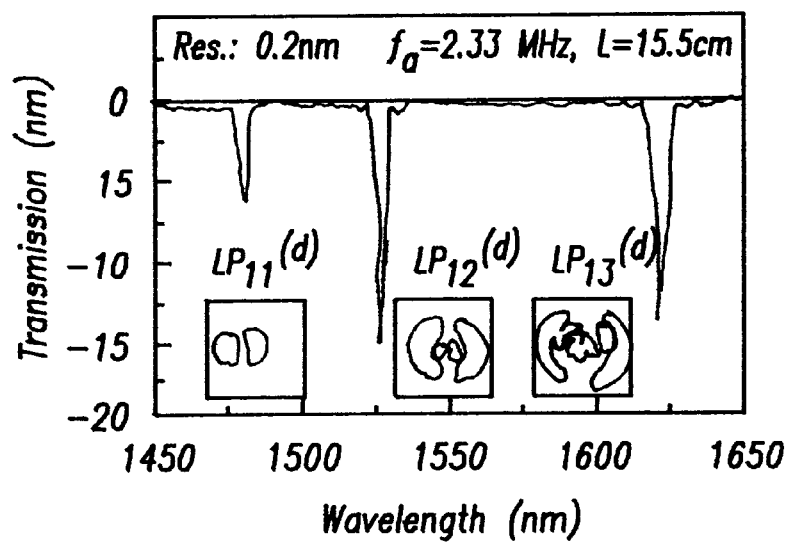
FIG.−18(a)
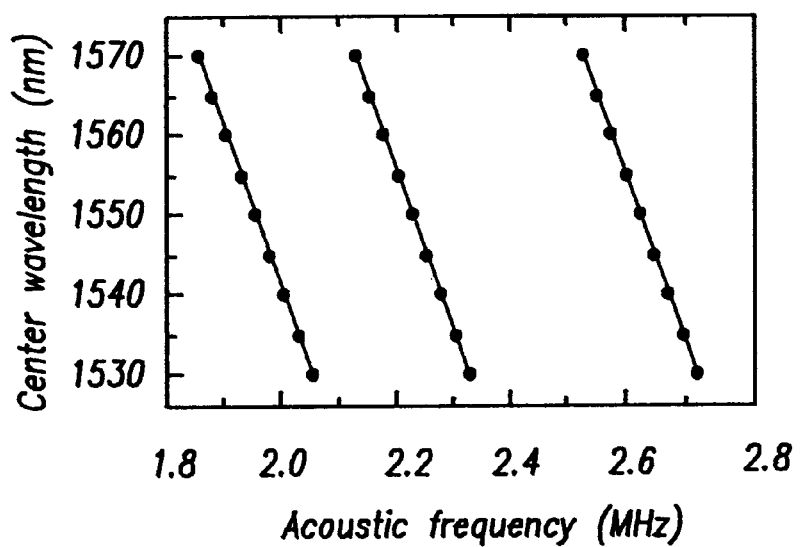
FIG.−18(b)

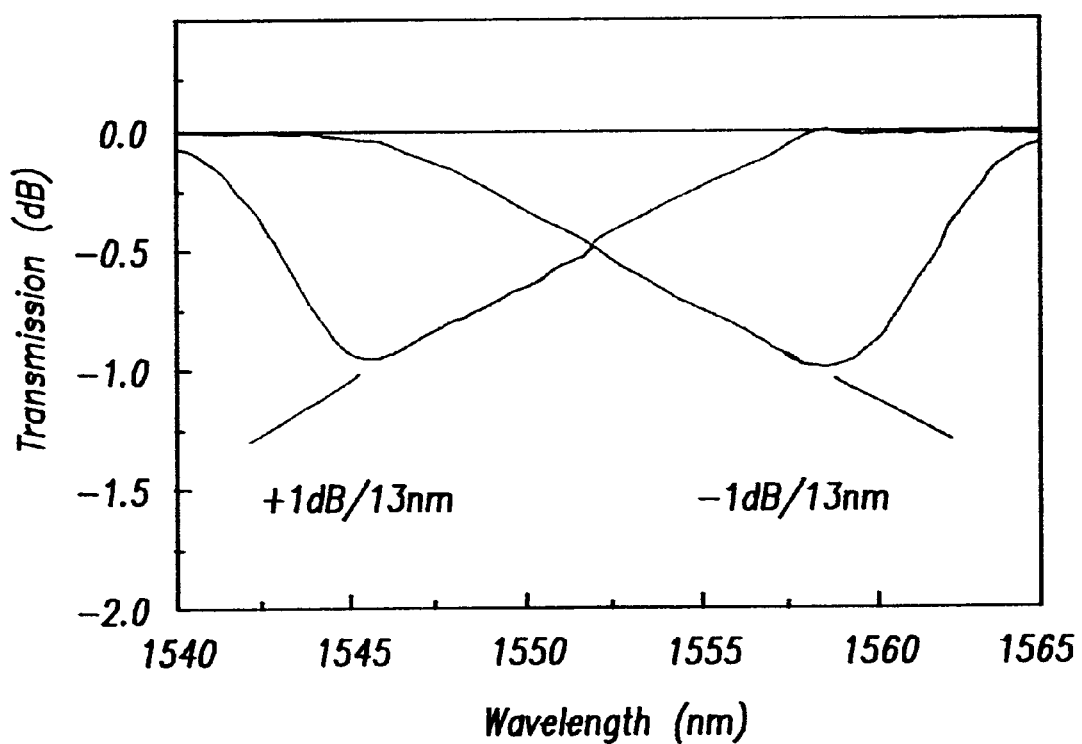
FIG.—19

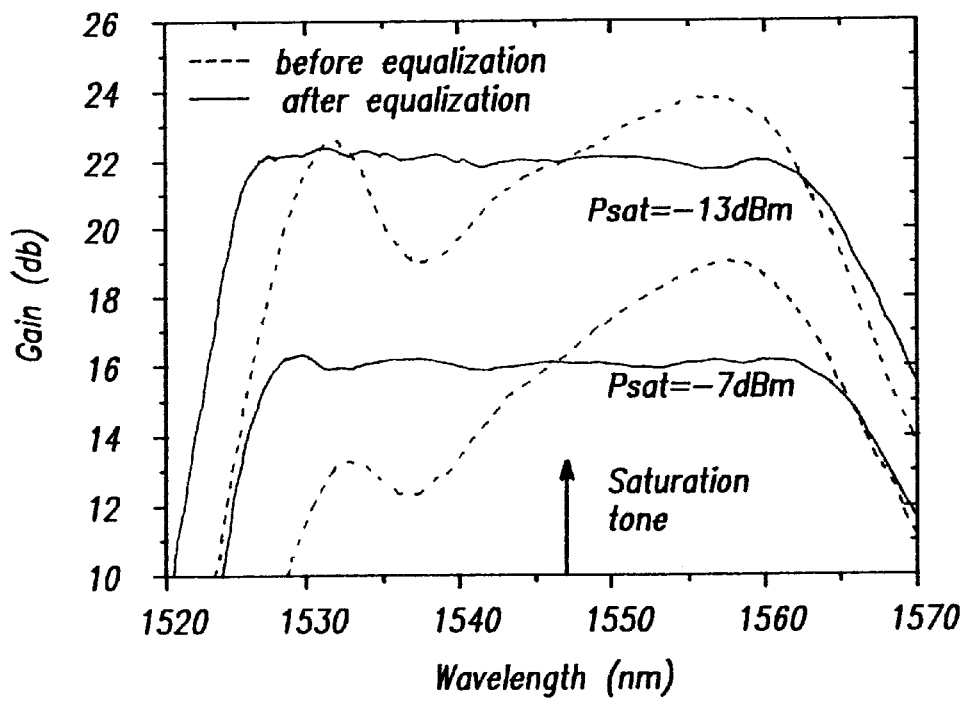
FIG.—21(a)
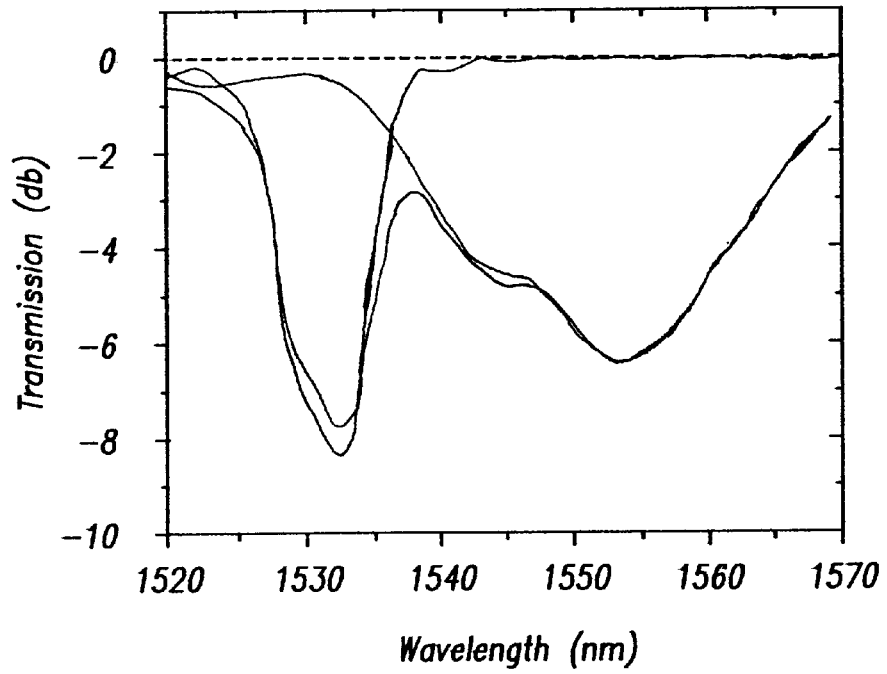
FIG.—21(b)

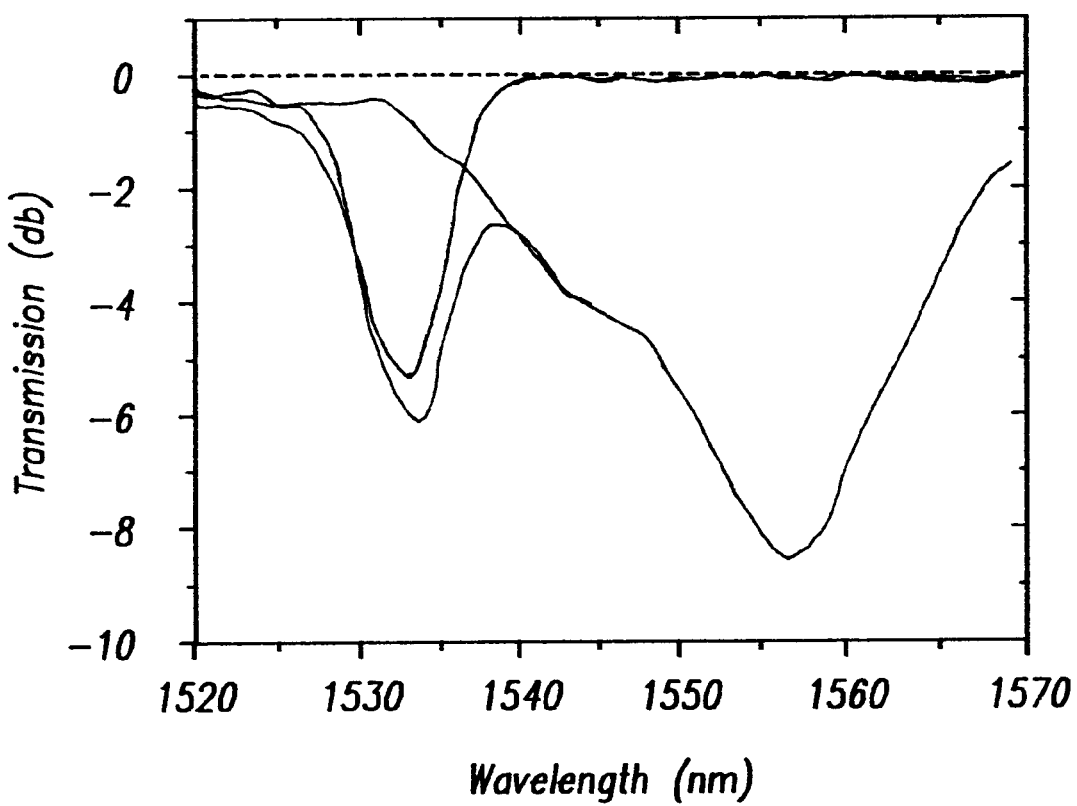
FIG.—21(c)

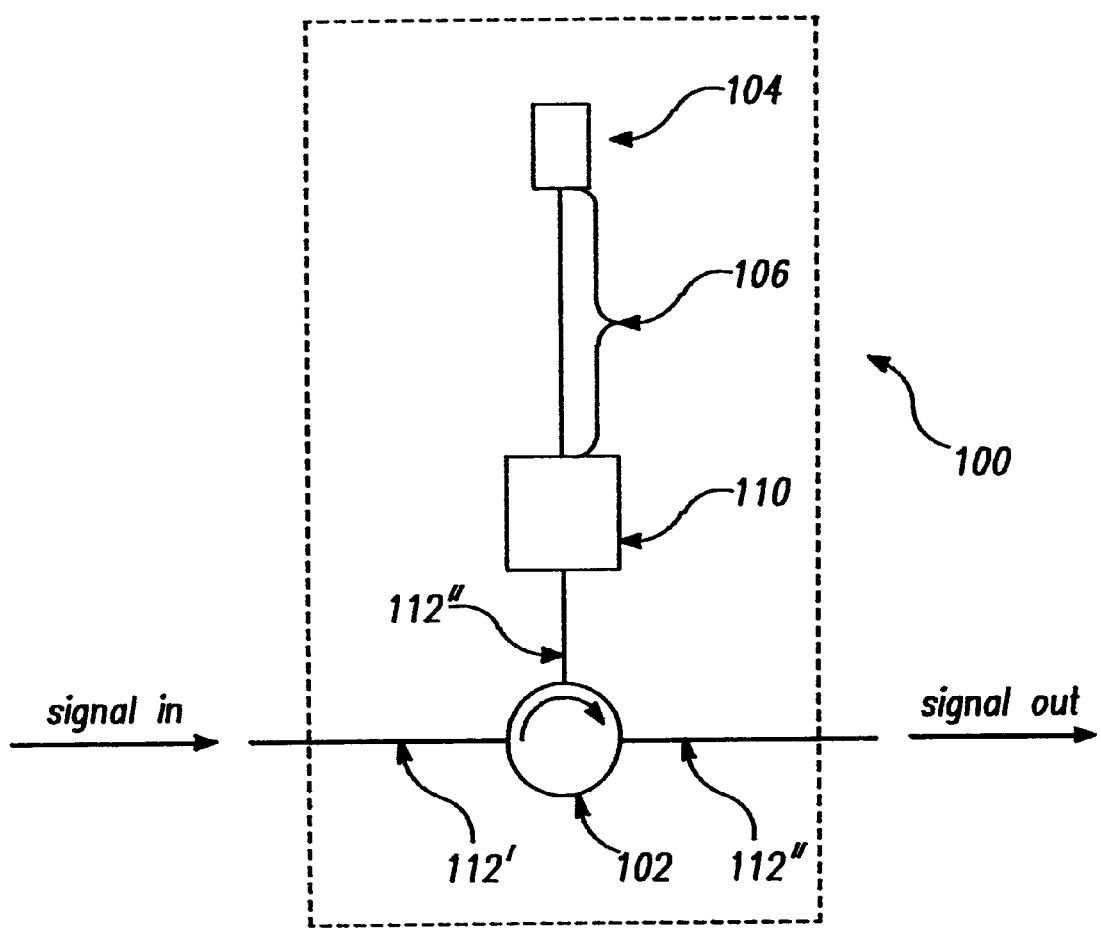
FIG.—23

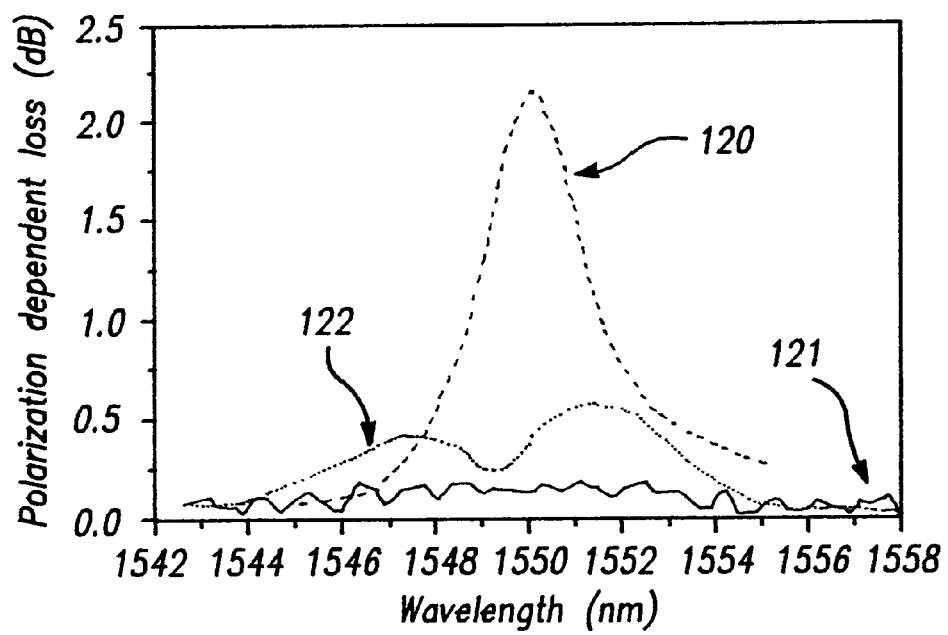
FIG.—24(a)
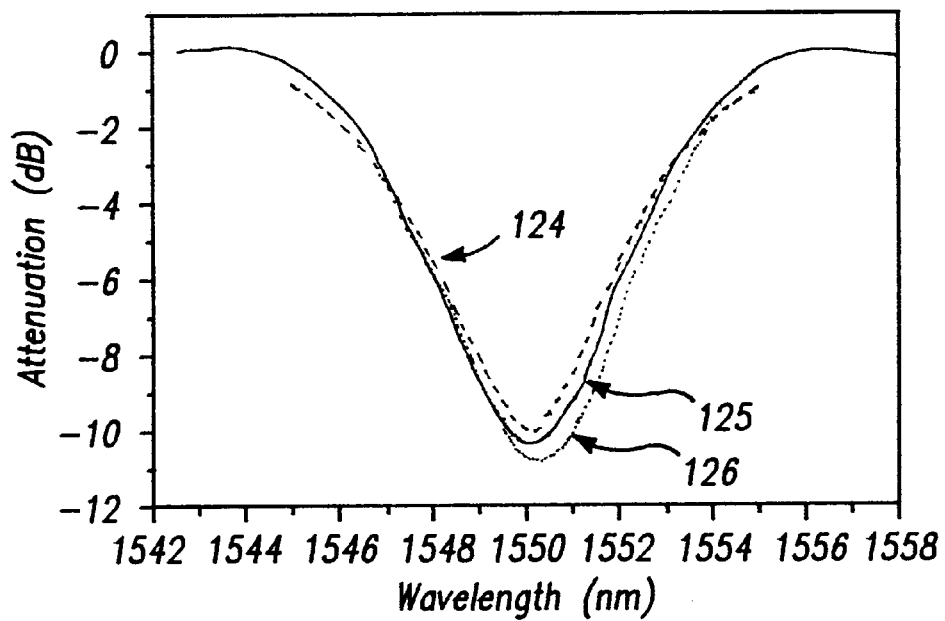
FIG.—24(b)

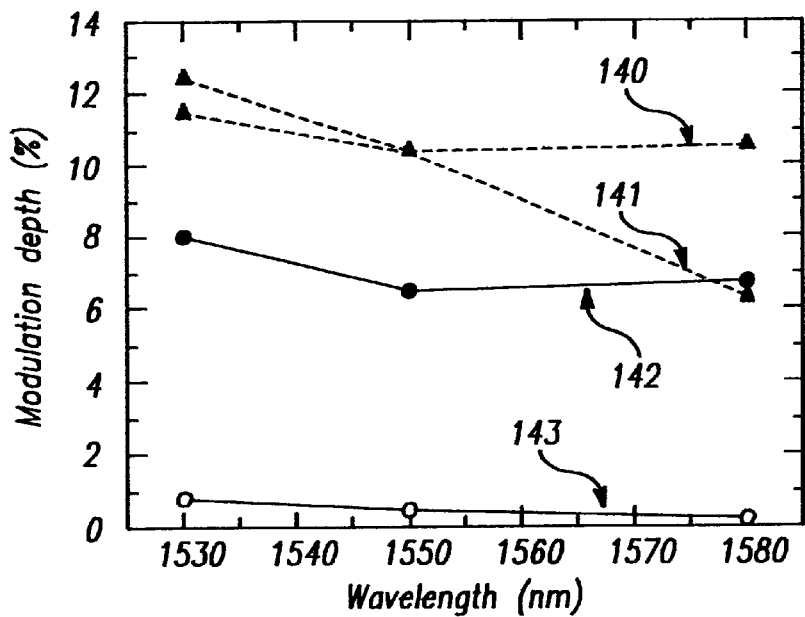
FIG.—27(a)
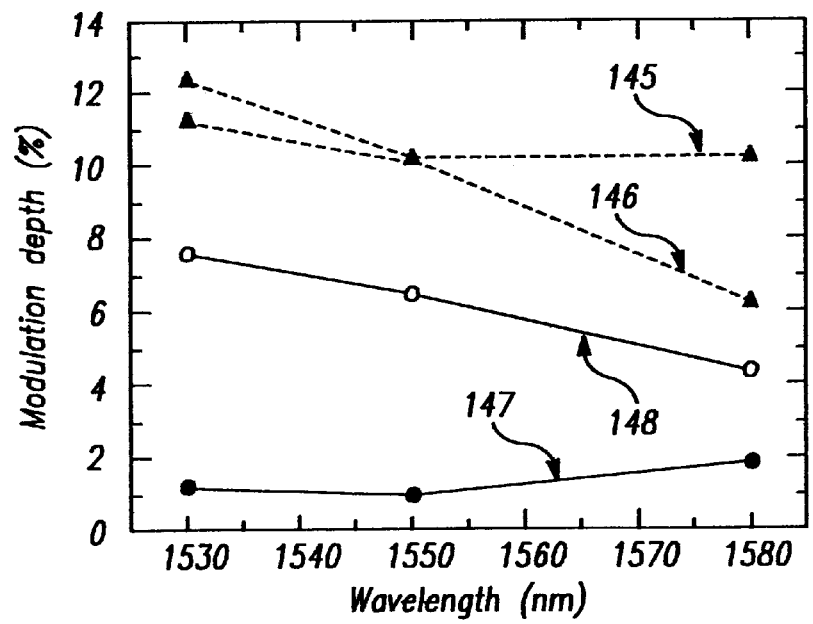
FIG.—27(b)

ACOUSTO-OPTIC FILTER

CROSS-REFERENCE TO RELATED APPLICATIONS

This application is a continuation-in-part of U.S. patent application Ser. No. 09/022,413, filed Feb. 12, 1998, now U.S. Pat. No. 6,021,237, which is claims priority to Korean Application No. 97-24796, filed Jun. 6, 1997.

BACKGROUND OF THE INVENTION

1. Field of the Invention

This invention relates generally to telecommunication systems and assemblies, and more particularly to an AOTF and a system that uses at least one AOTF.

2. Description of Related Art

In modern telecommunication systems, many operations with digital signals are performed on an optical layer. For example, digital signals are optically amplified, multiplexed and demultiplexed. In long fiber transmission lines, the amplification function is performed by Erbium Doped Fiber Amplifiers (EDFA's). The amplifier is able to compensate for power loss related to signal absorption, but it is unable to correct the signal distortion caused by linear dispersion, 4-wave mixing, polarization distortion and other propagation effects, and to get rid of noise accumulation along the transmission line. For these reasons, after the cascade of multiple amplifiers the optical signal has to be regenerated every few hundred kilometers. In practice, the regeneration is performed with electronic repeaters using optical-to-electronic conversion. However to decrease system cost and improve its reliability it is desirable to develop a system and a method of regeneration, or signal refreshing, without optical to electronic conversion. An optical repeater that amplifies and reshapes an input pulse without converting the pulse into the electrical domain is disclosed, for example, in the U.S. Pat. No. 4,971,417, "Radiation-Hardened Optical Repeater". The repeater comprises an optical gain device and an optical thresholding material producing the output signal when the intensity of the signal exceeds a threshold. The optical thresholding material such as polydiacetylene thereby performs a pulse shaping function. The nonlinear parameters of polydiacetylene are still under investigation, and its ability to function in an optically thresholding device has to be confirmed.

Another function vital to the telecommunication systems currently performed electronically is signal switching. The switching function is next to be performed on the optical level, especially in the Wavelength Division Multiplexing (WDM) systems. There are two types of optical switches currently under consideration. First, there are wavelength insensitive fiber-to-fiber switches. These switches (mechanical, thermo and electro-optical etc.) are dedicated to redirect the traffic from one optical fiber to another, and will be primarily used for network restoration and reconfiguration. For these purposes, the switching time of about 1 msec (typical for most of these switches) is adequate; however the existing switches do not satisfy the requirements for low cost, reliability and low insertion loss. Second, there are wavelength sensitive switches for WDM systems. In dense WDM systems having a small channel separation, the optical switching is seen as a wavelength sensitive procedure. A small fraction of the traffic carried by specific wavelength should be dropped and added at the intermediate communication node, with the rest of the traffic redirected to different fibers without optical to electronic conversion. This functionality promises significant cost saving in the future networks. Existing wavelength sensitive optical switches are usually bulky, power-consuming and introduce significant loss related to fiber-to-chip mode conversion. Mechanical switches interrupt the traffic stream during the switching time. Acousto-optic tunable filters, made in bulk optic or integrated optic forms, (AOTFs) where the WDM channels are split off by coherent interaction of the acoustic and optical fields though fast, less than about 1 microsecond, are polarization and temperature dependent. Furthermore, the best AOTF consumes several watts of RF power, has spectral resolution about 3 nm between the adjacent channels (which is not adequate for current WDM requirements), and introduces over 5 dB loss because of fiber-to-chip mode conversions.

Another wavelength-sensitive optical switch may be implemented with a tunable Fabry Perot filter (TFPF). When the filter is aligned to a specific wavelength, it is transparent to the incoming optical power. Though the filter mirrors are almost 100% reflective no power is reflected back from the filter. With the wavelength changed or the filter detuned (for example, by tilting the back mirror), the filter becomes almost totally reflective. With the optical circulator in front of the filter, the reflected power may be redirected from the incident port. The most advanced TFPF with mirrors built into the fiber and PZT alignment actuators have only 0.8 dB loss. The disadvantage of these filters is a need for active feedback and a reference element for frequency stability.

There is a need for an improved acousto-optic filter as well as communication systems with improved acousto-optic filters.

SUMMARY OF THE INVENTION

Accordingly, an object of the present invention is to provide an improved acousto-optic filter.

Another object of the present invention is to provide a tunable acousto-optic filter.

A further object of the present invention is to provide a tunable acousto-optic filter that includes a single mode optical fiber.

Still another object of the present invention is to provide an acoustic optic filter with multiple acoustic signals that have individual controllable strengths and frequencies.

Yet another object of the present invention is to provide an acoustic optic filter with multiple acoustic signals that have individual controllable strengths and frequencies, and each of the acoustic signals provides a coupling between the core mode and a different cladding mode.

Another object of the present invention is to provide an acousto-optic filter that includes an acoustic wave generator and an optical fiber with a core and a cladding, and a wavelength of an optical signal coupled to the cladding from the core is changed by varying the frequency of a signal applied to the acoustic wave generator.

Yet a further object of the present invention is to provide an acousto-optic filter that includes an optical fiber with a core and a cladding where a strength or magnitude of an optical signal coupled from the core to the cladding is changed by varying the amplitude of a signal applied to an acousto-optical wave.

These and other objects of the invention are achieved in an acousto-optic filter that includes a non-birefringent single mode optical fiber with a longitudinal axis, a core and a cladding in a surrounding relationship to the core. The optical fiber has multiple cladding modes and a single core mode that is guided along the core. An acoustic wave propagation member has a proximal end and a distal end coupled to the optical fiber. The acoustic wave propagation member propagates an acoustic wave from the proximal to the distal end and launches a flexural wave in the optical fiber. At least one acoustic wave generator is coupled to the proximal end of the acoustic wave propagation member.

In another embodiment of the present invention, a heatsink is coupled to the acoustic wave generator. The acoustic wave generator is positioned between the acoustic wave propagation member and the heatsink.

In yet another embodiment of the present invention, an acoustic damper is positioned at a distal portion of the optical fiber. An interactive region extends from the distal end of the acoustic wave propagation member to a proximal portion of the acoustic damper.

In another embodiment of the present invention, an optical communication system is provided with a transmitter. The transmitter includes an acoustic-optic filter that has a single mode optical fiber with a longitudinal axis, a core and a cladding in a surrounding relationship to the core. The optical fiber has multiple cladding modes and a single core mode guided along the core. An acoustic wave propagation member is included with a proximal end and a distal end. The distal end of the acoustic wave propagation member is coupled to the optical fiber. The acoustic wave propagation member propagates an acoustic wave from the proximal to the distal end and launches a flexural wave in the optical fiber. At least one acoustic wave generator is coupled to the proximal end of the acoustic wave propagation member. A receiver is coupled to the transmitter.

In another embodiment of the present invention, an optical communication system is provided with a transmitter and a receiver. The receiver includes an acoustic-optic filter that has a single mode optical fiber with a longitudinal axis, a core and a cladding in a surrounding relationship to the core. The optical fiber has multiple cladding modes and a single core mode guided along the core. An acoustic wave propagation member is included with a proximal end and a distal end. The distal end of the acoustic wave propagation member is coupled to the optical fiber. The acoustic wave propagation member propagates an acoustic wave from the proximal to the distal end and launches a flexural wave in the optical fiber. At least one acoustic wave generator is coupled to the proximal end of the acoustic wave propagation member.

In another embodiment of the present invention, an optical communication system is provided with a transmitter coupled to a receiver. The receiver includes an acoustic-optic filter that has a single mode optical fiber with a longitudinal axis, a core and a cladding in a surrounding relationship to the core. The optical fiber has multiple cladding modes and a single core mode guided along the core. An acoustic wave propagation member is included with a proximal end and a distal end. The distal end of the acoustic wave propagation member is coupled to the optical fiber. The acoustic wave propagation member propagates an acoustic wave from the proximal to the distal end and launches a flexural wave in the optical fiber. At least one acoustic wave generator is coupled to the proximal end of the acoustic wave propagation member.

BRIEF DESCRIPTION OF THE FIGURES

FIG. 3(a) is a cross-sectional view illustrating one embodiment of an interface created between an optical fiber and a channel formed in an acoustic wave propagation member of the FIG. 1 AOTF.

FIG. 3(b) is a cross-sectional view illustrating an embodiment of an interface between an optical fiber and a channel formed in an acoustic wave propagation member of the FIG. 1 AOTF where a bonding material is used.

FIG. 4 is a schematic diagram of one embodiment of an AOTF of the present invention with an acoustic damper.

FIG. 5 is a cross-sectional view of one embodiment of an index profile of an optical fiber, useful with the AOTF of FIG. 1, that has a doubling cladding.

FIG. 6 is a cross-sectional view of an optical fiber with sections that have different diameters.

FIG. 7 is a cross-sectional view of an optical fiber with a tapered section.

FIG. 8 is a perspective view of one embodiment of an AOTF of the present invention that includes a heatsink and two mounts.

FIG. 12 is a graph showing the coupling and transmittance of the filter of FIG. 1.

FIGS. 16(a)–(b) are graphs showing the transmittance characteristics of the filter of FIG. 11 when varying an electric signal with a three frequency component applied to the filter.

FIGS. 18(a) illustrate one embodiment of a transmission spectrum of the FIG. 11 filter.

FIG. 18(b) illustrates the measured and the calculated center wavelengths of the notches as a function of acoustic frequency of an embodiment of the FIG. 11 filter.

FIG. 19 illustrates two examples of configurable spectral profiles with spectral tilt from the FIG. 11 filter.

FIG. 21(a) is a graph of gain profiles of an EDFA with the filter of FIG. 20(a).

FIG. 21(b) is a graph illustrating filter profiles that produced the flat gain profiles shown in FIG. 21(a).

FIG. 21(c) is a graph illustrating filter profiles of the FIG. 20(a) filter assembly.

FIG. 23 illustrates one embodiment of the present invention from FIG. 4 that has a reduction with a lower polarization dependent loss.

FIGS. 24(a) and 24(b) are graphs illustrating the polarization dependent loss profile of one embodiment of the invention, from FIG. 4, when the filter is operated to produce 10-dB attenuation at 1550 nm.

FIG. 27(a) is a graph illustrating, in one embodiment of FIG. 4, the modulation depth at 10-dB attenuation level at both first- and second-harmonics of the acoustic frequency.

FIG. 27(b) is a graph illustrating the modulation depth of first- and second-harmonics components from FIG. 27(a).

DETAILED DESCRIPTION

Figure 1A:
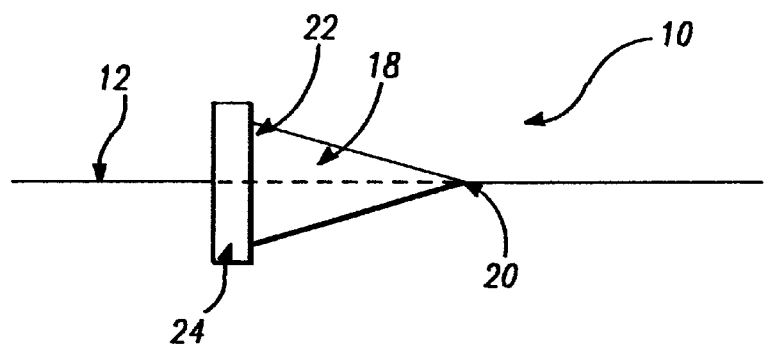
FIG. 1(a) is a schematic diagram of one embodiment of an AOTF of the present invention.
Figure 1B:
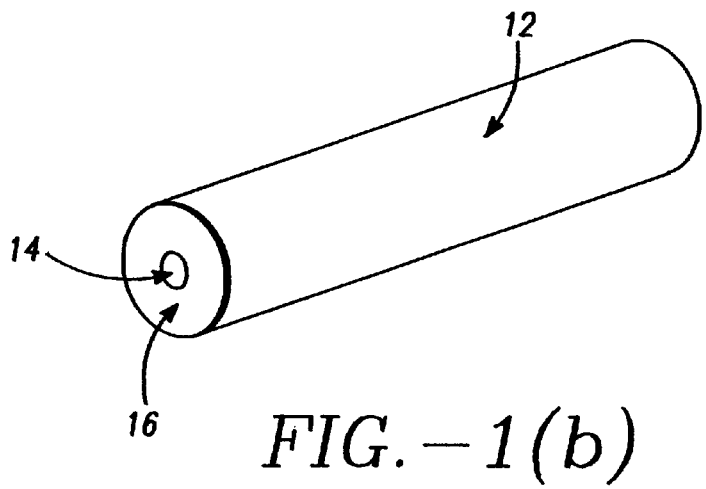
FIG. 1(b) is a cross-sectional view of the optical fiber of the FIG. 1 AOTF.

FIG. 1 illustrates one embodiment of an AOTF (hereafter filter 10) of the present invention. A non-birefringent single mode optical fiber 12 has a longitudinal axis, a core 14 and a cladding 16 in a surrounding relationship to core 14. Optical fiber 12 has multiple cladding modes and a single core mode guided along core 14. Optical fiber 12 provides fundamental and cladding mode propagation along a selected length of optical fiber 12. In one embodiment, optical fiber 12 is tensioned. Sufficient tensioning can be applied in order to reduce losses in a flexure wave propagated in optical fiber 12.

The core of the non-birefringent fiber is substantially circular-symmetric. The circular symmetry ensures that the refractive index of the core mode is essentially insensitive to the state of optical polarization. In contrast, in hi-birefringent single mode fibers the effective refractive index of the core mode is substantially different between two principal polarization states. The effective refractive index difference between polarization modes in high birefringence single mode fibers is generally greater than $10^{-4}$. A highly elliptical core and stress-inducing members in the cladding region are two main techniques to induce large birefringence. In non-birefringent fibers, the effective index difference between polarization states is generally smaller than $10^{-5}$.

An acoustic wave propagation member 18 has a distal end 20 that is coupled to optical fiber 12. Acoustic wave propagation member 18 propagates an acoustic wave from a proximal end 22 to distal end 20 and launches a flexural wave in optical fiber 12. The flexural wave creates a periodic microbend structure in the optical fiber. The periodic microbend induces an antisymmetric refractive index change in the fiber and, thereby, couples light in the fiber from a core mode to cladding modes. For efficient mode coupling, the period of the microbending, or the acoustic wavelength, should match the beatlength between the coupled modes. The beatlength is defined by the optical wavelength divided by the effective refractive index difference between the two modes.

Acoustic wave propagation member 18 can be mechanically coupled to the optical fiber and minimizes acoustic coupling losses in between the optical fiber and the acoustic wave propagation member. In one embodiment, acoustic wave propagation member 18 is coupled to optical fiber 12 in a manner to create a lower order mode flexure wave in optical fiber 12. In another embodiment, acoustic wave propagation member 18 is coupled to the optical fiber to match a generation of modes carried by optical fiber 12.

Acoustic wave propagation member 18 can have a variety of different geometric configurations but is preferably elongated. In various embodiments, acoustic wave propagation member 18 is tapered proximal end 22 to distal end 20 and can be conical. Generally, acoustic wave propagation member 18 has a longitudinal axis that is parallel to a longitudinal axis of optical fiber 12.

At least one acoustic wave generator 24 is coupled to proximal end 22 of acoustic wave propagation member. Acoustic wave generator 24 can be a shear transducer.

Acoustic wave generator 24 produces multiple acoustic signals with individual controllable strengths and frequencies. Each of the acoustic signals can provide a coupling between the core mode and a different cladding mode. Acoustic wave generator 24 can produce multiple acoustic signals with individual controllable strengths and frequencies. Each of the acoustic signals provides a coupling between the core mode and a different cladding mode of optical fiber 12. A wavelength of an optical signal coupled to cladding 16 from core 14 is changed by varying the frequency of a signal applied the acoustic wave generator 24.

Acoustic wave generator 24 can be made at least partially of a piezoelectric material whose physical size is changed in response to an applied electric voltage. Suitable piezoelectric materials include but are not limited to quartz, lithium niobate and PZT, a composite of lead, zinconate and titanate. Other suitable materials include but are not limited to zinc monooxide. Acoustic wave generator 24 can have a mechanical resonance at a frequency in the range of 1–20 MHz and be coupled to an RF signal generator.

Figure 2:
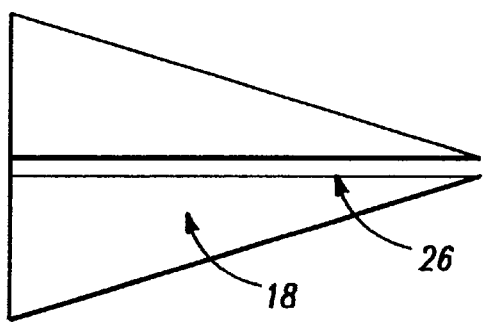
FIG. 2 is a cross-sectional view of one embodiment of an acoustic wave propagation member that can be used with the AOTF of FIG. 1.

Referring now to FIG. 2, one embodiment of acoustic wave propagation member 18 has an interior with an optical fiber receiving channel 26. Channel 26 can be a capillary channel with an outer diameter slightly greater than the outer diameter of the fiber used and typically in the range of 80–150 microns. The length of the capillary channel is preferably in the range of 5–15 mm. The interior of acoustic wave propagation member 18 can be solid. Additionally, acoustic wave propagation member 18 can be a unitary structure.

Optical fiber 12 is coupled to acoustic wave propagation member 18. As illustrated in FIG. 3(a), the dimensions of channel 26 and an outer diameter of optical fiber 12 are sufficiently matched to place the two in a contacting relationship at their interface. In this embodiment, the relative sizes of optical fiber 12 and channel 26 need only be substantially the same at the interface. Further, in this embodiment, the difference in the diameter of optical fiber 12 and channel 26 are in the range of 1–10 microns In another embodiment, illustrated in FIG. 3(b), a coupling member 28 is positioned between optical fiber 12 and channel 26 at the interface. Suitable coupling members 28 including but are not limited to bonding materials, epoxy, glass solder, metal solder and the like.

The interface between channel 26 and optical fiber 12 is mechanically rigid for efficient transduction of the acoustic wave from the acoustic wave propagation member 18 to the optical fiber 12.

Preferably, the interface between optical fiber 12 and channel 26 is sufficiently rigid to minimize back reflections of acoustic waves from optical fiber 12 to acoustic wave propagation member 18.

In the embodiments of FIGS. 3(*a*) and 3(*b*), acoustic wave propagation member 18 is a horn that delivers the vibration motion of acoustic wave generator 24 to optical fiber 12. The conical shape of acoustic wave propagation member 18, as well as its focusing effect, provides magnification of the acoustic amplitude at distal end 20, which is a sharp tip. Acoustic wave propagation member 18 can be made from a glass capillary, such as fused silica, a cylindrical rod with a central hole, and the like.

In one embodiment, a glass capillary is machined to form a cone and a flat bottom of the cone was bonded to a PZT acoustic wave generator 24. Optical fiber 12 was bonded to channel 26. Preferably, distal end 20 of acoustic wave generator 18 is as sharp as possible to minimize reflection of acoustic waves and to maximize acoustic transmission. Additionally, the exterior surface of acoustic wave generator 18 is smooth. In another embodiment, acoustic wave generator 18 is a horn with a diameter that decreases exponentially from proximal end 22 to distal end 20.

As illustrated in FIG. 4, filter 10 can also include an acoustic damper 30 that is coupled to optical fiber 12. Acoustic damper 30 includes a jacket 32 that is positioned in a surrounding relationship to optical fiber 12. Acoustic damper 30 absorbs incoming acoustic waves and minimizes reflections of the acoustic wave. The reflected acoustic wave causes an intensity modulation of the optical signal passing through the filter by generating frequency sidebands in the optical signal. The intensity modulation is a problem in most applications. A proximal end 34 of the acoustic damper 30 can be tapered. Acoustic damper 30 can be made of a variety of materials. In one embodiment, acoustic damper 30 is made of a soft material that has a low acoustic impedance so that minimizes the reflection of the acoustic wave. Jacket 32 itself is a satisfactory damper and in another embodiment jacket 32 takes the place of acoustic damper 30. Optionally, jacket 32 is removed from that portion of optical fiber 12 in a interactive region 36 and that portion of optical fiber 12 that is bonded to acoustic wave generator 24.

The interactive region is where an optical signal is coupled to cladding 16 from core 14. This coupling is changed by varying the frequency of a signal applied to acoustic wave generator 24. In one embodiment, interactive region 36 extends from distal end 20 to at least a proximal portion within acoustic damper 30. In another embodiment, interactive region 36 extends from distal end 20 and terminates at a proximal end of acoustic damper 30. In one embodiment, the length of optical fiber 12 in interactive region is less than 1 meter, and preferably less than 20 cm. The nonuniformity of the fiber reduces the coupling efficiency and also causes large spectral sidebands in the transmission spectrum of the filter. Another problem of the long length is due to the mode instability. Both the polarization states of the core and cladding modes and the orientation of the symmetry axis of an antisymmetric cladding mode are not preserved as the light propagates over a long length greater than 1 m. This modal instability also reduces the coupling efficiency and causes large spectral sidebands. Preferably, the outer diameter of optical fiber 12, with jacket 32, is in the range of 60–150 microns.

The profile of the refractive index of the cross section of optical fiber 12 influences its filtering characteristics. One embodiment of optical fiber 12, illustrated in FIG. 5, has a first and second cladding 16' and 16" with core 14 that has the highest refractive index at the center. First cladding 16' has an intermediate index and second cladding 16" has the lowest index. Most of the optical energy of several lowest-order cladding modes is confined both only in core 14 and first cladding 16'. The optical energy falls exponentially from the boundary between first and second claddings 16' and 16", respectively.

Optical fields are negligible at the interface between second cladding 16" and the surrounding air, the birefringence in the cladding modes, due to polarization-induced charges, is much smaller than in conventional step-index fibers where second cladding 16" does not exist. The outer diameter of first cladding 16' is preferably smaller than that of second cladding 16", and can be smaller by at least 5 microns. In one specific embodiment, core 14 is 8.5 microns, first cladding 16' has an outer diameter of 100 microns and second cladding 16" has an outer diameter of 125 microns. Preferably, the index difference between core 14 and first cladding 16' is about 0.45%, and the index difference between first and second claddings 16' and 16" is about 0.45%.

In another embodiment, the outer diameter of first cladding 16' is sufficiently small so that only one or a few cladding modes can be confined in first cladding 16'. One specific example of such an optical fiber 12 has a core 14 diameter of 4.5 microns, first cladding 16' of 10 microns and second cladding 16" of 80 microns, with the index difference between steps of about 0.45% each.

The optical and acoustic properties of optical fiber 12 can be changed by a variety of different methods including but not limited to, (i) fiber tapering, (ii) ultraviolet light exposure, (iii) thermal stress annealing and (iv) fiber etching.

One method of tapering optical fiber 12 is achieved by heating and pulling it. A illustration of tapered optical fiber 12 is illustrated in FIG. 6. As shown, a uniform section 38 of narrower diameter is created and can be prepared by a variety of methods including but not limited to use of a traveling torch. Propagation constants of optical modes can be greatly changed by the diameter change of optical fiber 12. The pulling process changes the diameter of core 14 and cladding 16 and also changes the relative core 14 size due to dopant diffusion. Additionally, the internal stress distribution is modified by stress annealing. Tapering optical fiber 12 also changes the acoustic velocity.

When certain doping materials of optical fiber 12 are exposed to ultraviolet light their refractive indices are changed. In one embodiment, Ge is used as a doping material in core 14 to increase the index higher than a pure $SiO_2$ cladding 16. When a Ge-doped optical fiber 12 is exposed to ultraviolet light the index of core 14 can be changed as much as 0.1%. This process also modifies the internal stress field and in turn modifies the refractive index profile depending on the optical polarization state. As a result, the birefringence is changed and the amount of changes depends on optical modes. This results in changes of not only the filtered wavelength at a given acoustic frequency or vice versa but also the polarization dependence of the filter. Therefore, the UV exposure can be an effective way of trimming the operating acoustic frequency for a given filtering wavelength as well as the polarization dependence that should preferably be as small as possible in most applications.

Optical fiber 12 can be heated to a temperature of 800 to 1,300° C. or higher to change the internal stresses inside optical fiber 12. This results in modification of the refractive index profile. The heat treatment is another way of controlling the operating acoustic frequency for a given filtering wavelength as well as the polarization dependence.

The propagation velocity of the acoustic wave can be changed by chemically etching cladding 16 of optical fiber 12. In this case, the size of core 14 remains constant unless cladding is completely etched. Therefore, the optical property of core mode largely remains the same, however, that of a cladding mode is altered by a different cladding diameter. Appropriate etchants include but are not limited to hydro fluoride (HF) acid and BOE.

The phase matching of optical fiber 12 can be chirped. As illustrated in FIG. 6, a section 40 of optical fiber can have an outer diameter that changes along its longitudinal length. With section 40, both the phase matching condition and the coupling strength are varied along its z-axis 42 and the phase matching conditions for different wavelengths satisfied at different positions along the axis. The coupling then can take place over a wide wavelength range. By controlling the outer diameter as a function of its longitudinal axis 42, one can design various transmission spectrum of the filter. For example, uniform attenuation over a broad wavelength range is possible by an appropriate diameter control.

Chirping can also be achieved when the refractive index of core 14 is gradually changed along z-axis 42. In one embodiment, the refractive index of core 14 is changed by exposing core 14 to ultraviolet light with an exposure time or intensity as a function of position along the longitudinal axis. As a result, the phase matching condition is varied along z-axis 42. Therefore, various shapes of transmission spectrum of the filter can be obtained by controlling the variation of the refractive index as a function of the longitudinal axis 42.

As illustrated in FIG. 8 a heatsink 44 can be included to cool acoustic wave generator. In one embodiment, heatsink 44 has a proximal face 46 and a distal face 48 that is coupled to the acoustic wave generator 24. Preferably, acoustic wave generator 24 is bonded to distal face 48 by using a low-temperature-melting metal-alloy solder including but not limited to a combination of 95% zinc and 5% tin and indium-based solder materials. Other bonding material includes heat curable silver epoxy. The bonding material should preferably provide good heat and electrical conduction. Heatsink 44 provides a mount for the acoustic wave generator 24. Heatsink can be made of a variety of materials including but not limited to aluminum, but preferably is made of a material with a high heat conductivity and a low acoustic impedance.

Acoustic reflections at proximal face can be advantageous if controlled. By introducing some amount of reflection, and choosing a right thickness of heatsink 44, the RF response spectrum of acoustic wave generator 24 can be modified so the overall launching efficiency of the acoustic wave in optical fiber can be less dependent on the RF frequency.

In this case, the reflectivity and size of heatsink 44 is selected to provide a launching efficiency of the flexural wave into optical fiber 12 almost independent of an RF frequency applied to acoustic wave generator 24. The thickness of heatsink 44 is selected to provide a travel time of an acoustic wave from distal face 48 to proximal face 46, and from proximal face 46 to distal face 48 that substantially matches a travel time of the acoustic wave traveling through acoustic wave propagation member 24 from its proximal end to its distal end, and from its distal end to its proximal end. The heat sink material or the material for the attachment to the proximal face 46 is selected to provide the amount of back reflection from the heat sink that substantially matches the amount of back reflection from the acoustic wave propagation member. In various embodiments, the proximal and distal faces, 46, 48 of heatsink 44 have either rectangular or circular shapes with the following dimensions: 10×10 mm$^2$ for the rectangular shape and diameter of 10 mm for the cylindrical shaped heat sink.

However, acoustic back reflections due to proximal face 46 are preferably avoided. Acoustic reflections from the heat sink back to the acoustic wave generator are reduced by angling proximal face 46 at an angle greater than 45 degree or by roughing the face. The acoustic wave coming from the acoustic generator toward the angled proximal face 46 is reflected away from the acoustic generator, reducing the acoustic back reflection to the acoustic wave generator. The roughed face also reduces the acoustic reflection by scattering the acoustic wave to random directions. Preferably, the side faces of the heat sink are also roughened or grooved to scatter the acoustic wave and thereby to avoid the acoustic back reflection. Another method to reduce the back reflection is to attach an acoustic damping material at the proximal face 46. Suitable materials that reduce back reflections include soft polymers, silicone, and the like that can be applied to proximal face 46.

Referring again to FIG. 8, an acoustic damper mount 50 supports acoustic damper 30. Acoustic damper mount 50 can be made of a variety of materials including but not limited to silica, invar, and the like. A filter mount 52 supports heatsink 44 and acoustic damper mount 50. In one embodiment, filter mount is a plate-like structure. Preferably, filter mount 52 and optical fiber 12 have substantially the same thermal expansion coefficients. Filter mount 52 and fiber 12 can be made of the same materials.

Filter mount 52 and optical fiber 12 can have different thermal expansion coefficients and be made of different materials. In one embodiment, filter mount 52 has a lower thermal expansion coefficient than optical fiber 12. Optical fiber 12 is tensioned when mounted and bonded to the filter mount 52. The initial strain on optical fiber 12 is released when the temperate increases because the length of filter mount 52 is increased less than optical fiber 12. On the other hand, when the temperature decreases optical fiber 12 is stretched further. When the amount of strain change according to temperature change is appropriately chosen by selecting proper material for mount the 52, the filtering wavelength of filter 10 can be made almost independent of temperature. Without such mounting arrangement, the center wavelength of the filter increases with temperature. Additionally, interactive region 36 of is sufficiently tensioned to compensate for changes in temperature of the interactive region 36 and filter mount 52.

Figure 9:
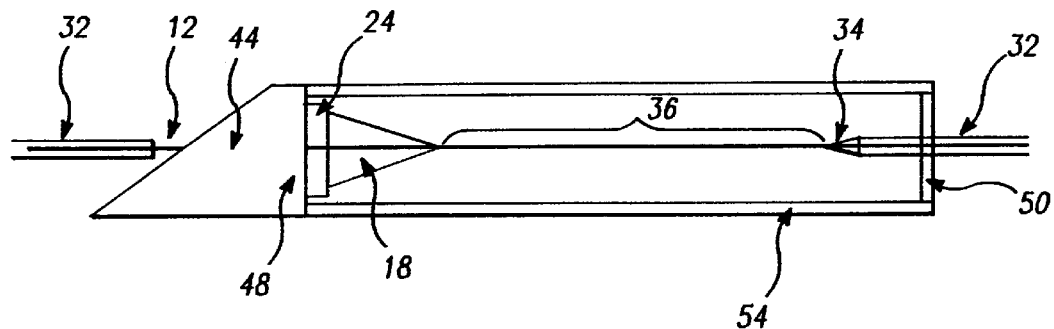
FIG. 9 is a perspective view of one embodiment of an AOTF of the present invention with a filter housing.

In another embodiment, illustrated in FIG. 9, a filter housing 54 encloses interactive region 36. Filter housing 54 can be made of a variety of materials, including but not limited to silica, invar and the like. Filter housing 54 eliminates the need for a separate filter mount 52. Filter housing 54 extends from distal face 48 of heatsink 44 to acoustic damper 30 or to a jacketed portion 32 of optical fiber 12. Acoustic wave propagation member 18, acoustic wave generator 24 and the acoustic damper 30 can be totally or at least partially positioned in an interior of filter housing 54.

In one embodiment, filter housing 54 and optical fiber 12 are made of materials with substantially similar thermal expansion coefficients. A suitable material is silica. Other materials are also suitable and include invar. Filter housing 54 and optical fiber 12 can have different thermal expansion coefficients and be made of different materials. In one embodiment, filter housing 54 has a lower thermal expansion coefficient than optical fiber 12.

In one embodiment, interactive region 36 is sufficiently tensioned sufficiently to compensate for changes in temperature of interactive region 36 and filter housing 54.

Figure 10:
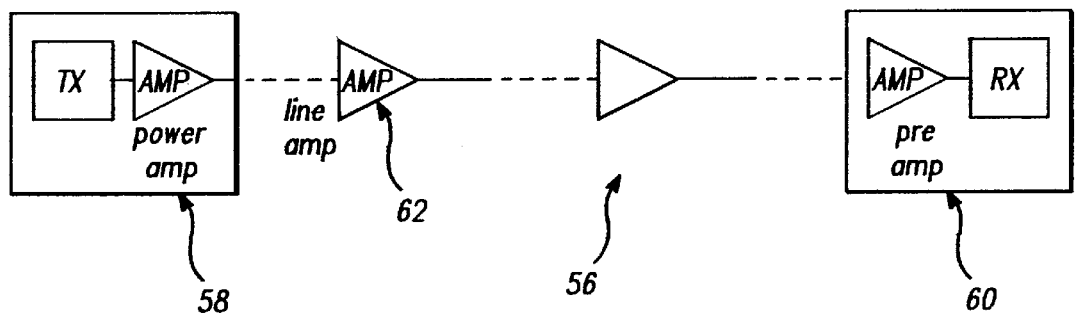
FIG. 10 is a block diagram of an optical communication system with one or more AOTF's of the present invention.

As illustrated in FIG. 10, filter 10 can be a component or subassembly of an optical communication system 56 that includes a transmitter 58 and a receiver 60. Transmission 58 can include a power amplifier with filter 10 and receiver 60 can also include a pre amplifier that includes filter 10. Additionally, optical communication system 56 may also have one or more line amplifiers that include filters 10.

Figure 11:
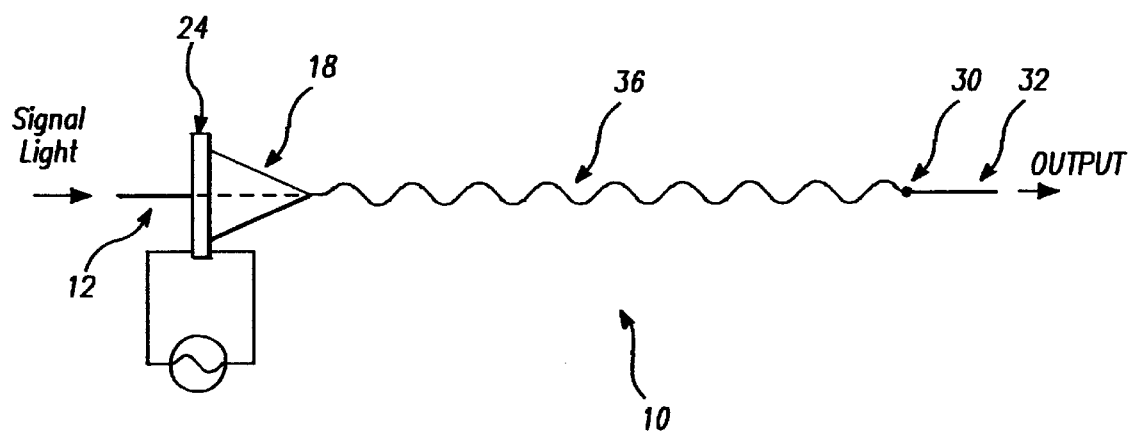
FIG. 11 is a schematic view showing the structure of an acousto-optic tunable filter according to one embodiment of the present invention.

Referring now to FIG. 11, if an electric signal 57 with constant frequency "f" is applied to acoustic wave generator 24, a flexural acoustic wave having the same frequency "f" is generated. The flexural acoustic wave is transferred to optical fiber 12 and propagates along optical fiber 12, finally absorbed in acoustic damper 30. The flexural acoustic wave propagating along optical fiber 12 produces periodic microbending along the fiber, resulting in the periodic change of effective refractive index which the optical wave propagating along optical fiber 12 experiences. The signal light propagating along optical fiber 12 in a core mode can be converted to a cladding mode by the change of effective refractive index in optical fiber 12.

When signal light is introduced into filter 10 part of the signal light is converted to a cladding mode due to the effect of the acoustic wave and the remainder of the signal light propagates as a core mode while the signal light propagates along interactive region 36. The signal light converted to a cladding mode cannot propagate any longer in optical fiber 12 with jacket 32 because the light is partly absorbed in optical fiber 12 or partly leaks from optical fiber 12. A variety of mode selecting means, including a mode conversion means between core modes and cladding modes, can be incorporated in filter 10. For example, the long-period grating described in the article "Long-period fiber-grating based gain equalizers" by A. M. Vengsarkar et al. in Optics Letters, Vol. 21, No. 5, p. 336, 1996 can be used as the mode selecting means. As another example, a mode coupler, which converts one or more cladding modes of one fiber to core modes of the same fiber or another fiber, can also be used.

A flexural acoustic wave generated by acoustic wave propagation member 18 propagates along interactive region 36. The acoustic wave creates antisymmetric microbends that travel along interactive region 36, introducing a periodic refractive-index perturbation along optical fiber 12. The perturbation produces coupling of an input symmetric fundamental mode to an antisymmetric cladding mode when the phase-matching condition is satisfied in that the acoustic wavelength is the same as the beat length between the two modes. The coupled light in the cladding mode is attenuated in jacket 32. For a given acoustic frequency, the coupling between the fundamental mode and one of the cladding modes takes place for a particular optical wavelength, because the beat length has considerable wavelength dispersion. Therefore, filter 10 can be operated as an optical notch filter. A center wavelength and the rejection efficiency are tunable by adjustment of the frequency and the voltage of RF signal applied to acoustic wave propagation member 18, respectively.

The coupling amount converted to a cladding mode is dependent on the wavelength of the input signal light. FIG. 12(a) shows the coupling amounts as functions of wavelength when flexural acoustic waves at the same frequency but with different amplitudes are induced in optical fiber 12. As shown in FIG. 12(a), the coupling amounts are symmetrical with same specific wavelength line ($\lambda_c$), i.e., center wavelength line, however they show different results 62 and 64 due to the amplitude difference of the flexural acoustic waves. Therefore, the transmittance of the output light which has passed through filter 12 is different depending on the wavelength of the input light. Filter 12 can act as a notch filter which filters out input light with specific wavelength as shown in FIG. 12(b).

FIG. 12(b) is a graph showing the transmittances as a function of wavelength when flexural acoustic waves with different amplitudes are induced in filter 12. The respective transmittances have same center wavelength as does the coupling amount, but different transmittance characteristic 64 and 66 depending on the amplitude difference of the flexural acoustic waves can be shown.

The center wavelength $\lambda_c$, of filter 10 satisfies the following equation.

$$\beta_{co}(\lambda) - \beta_{cl}(\lambda) = 2\pi/\lambda_a$$

In the above equation, $\beta_{co}(\lambda)$ and $\beta_{cl}(\lambda)$ are propagation constants of core mode and cladding mode in optical fiber 12 which are respectively dependent on the wavelength, and $\lambda_a$ represents the wavelength of the flexural acoustic waves.

Accordingly, if the frequency of the electric signal applied to acoustic wave generator 24 varies, the wavelength of the acoustic wave generated in optical fiber 12 also varies, which results in the center wavelength change of filter 10. In addition, since the transmission is dependent on the amplitude of the flexural acoustic wave, the transmission of signal light can be adjusted by varying the amplitude of the electric signal which is applied to acoustic wave generator 24.

Figure 13:
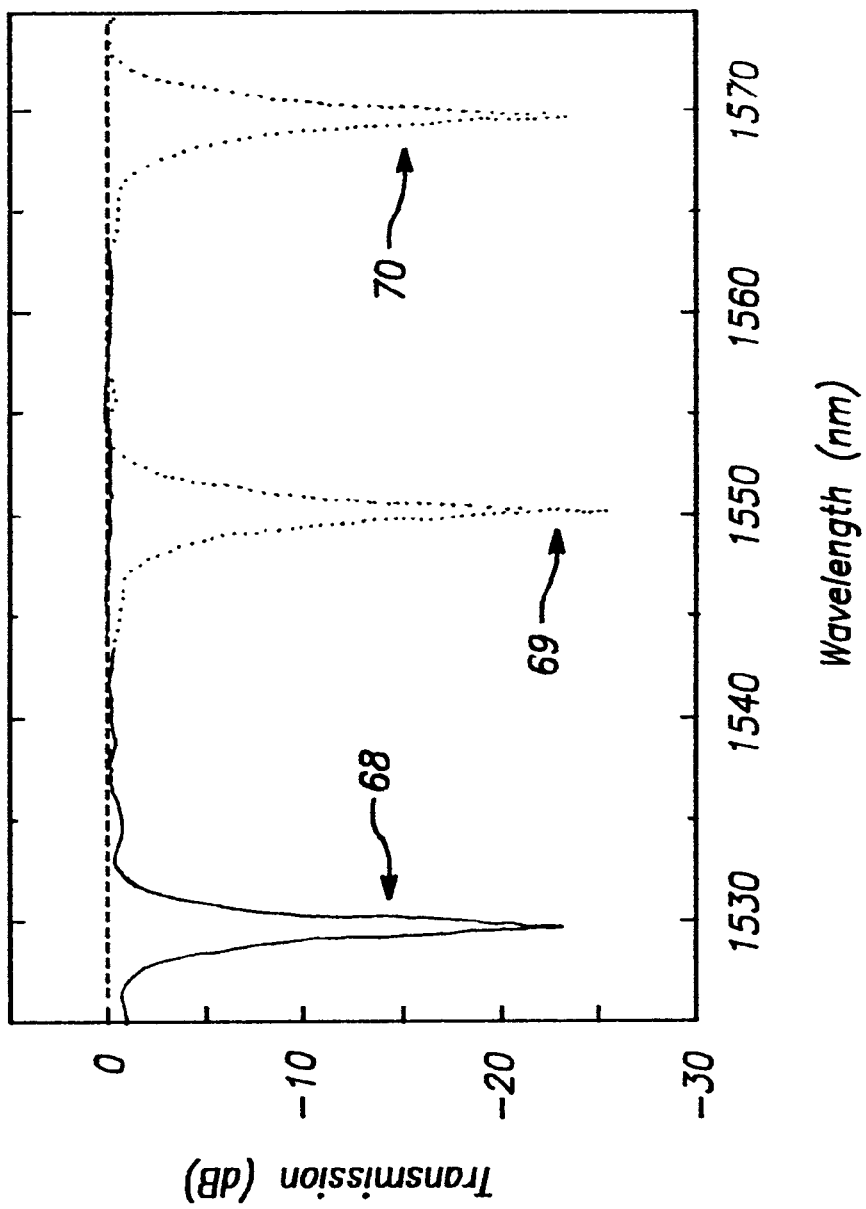
FIG. 13 is a graph showing the transmittance of the filter of FIG. 11.

FIG. 13 is a graph showing the transmittance of filter 10 in one embodiment when different electric signal frequencies are applied. As shown in FIG. 13, each center wavelength (i.e., wavelength showing maximum attenuation) of filter 10 for different electric signals was 1530 nm, 1550 nm and 1570 nm. Therefore the center wavelength of filter 10, according to the embodiment, is changed by varying the frequency of the electric signal which is applied to acoustic wave generator 24.

Figure 14:
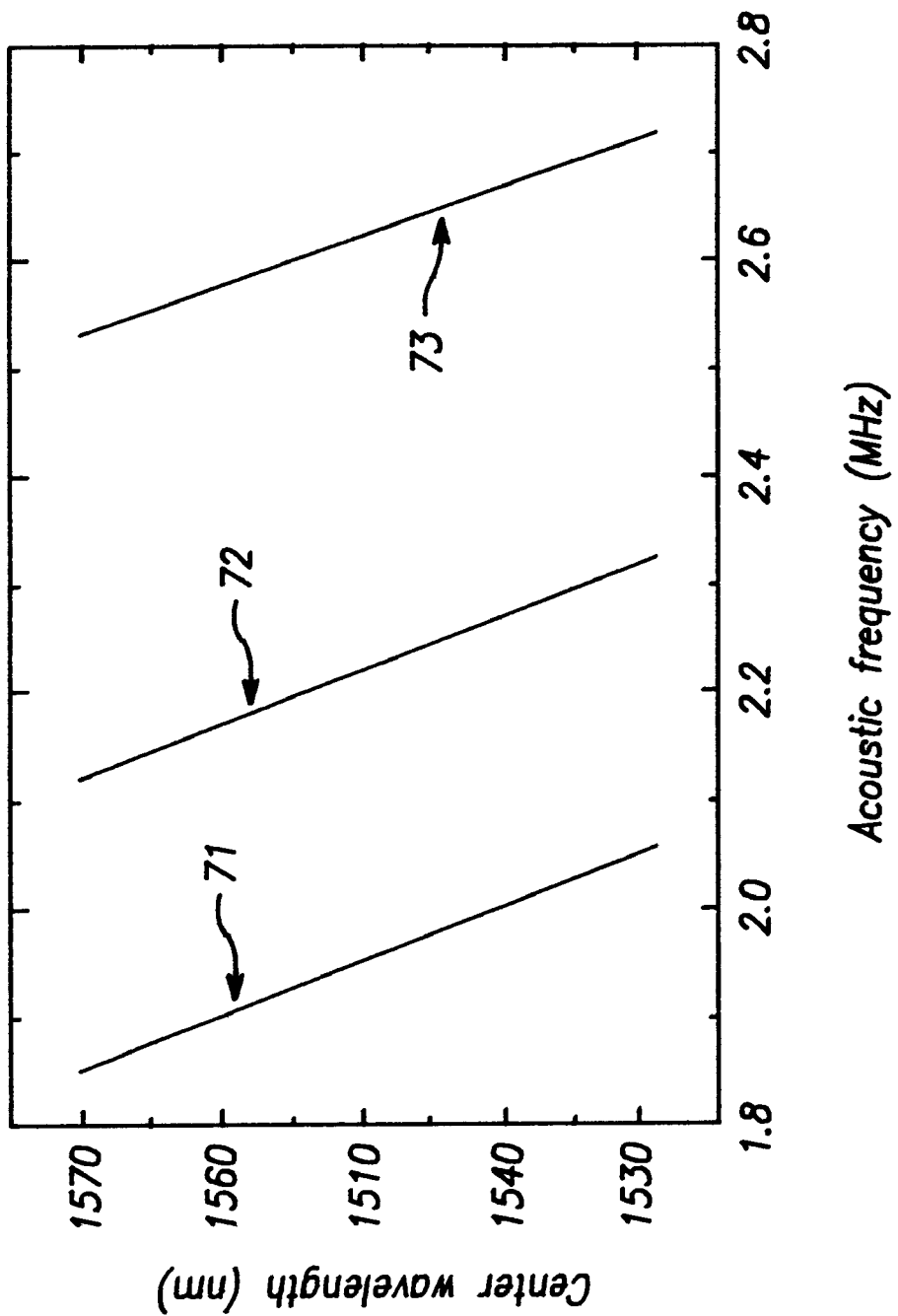
FIG. 14 is a graph showing the center wavelength of filter of FIG. 1 as a function of the frequency applied to the acoustic wave generator.

As described above, since there are a plurality of cladding modes in interactive region 36 the core mode can be coupled to several cladding modes. FIG. 14 is a graph showing the center wavelength of filter 10 according to the embodiment of the invention as a function of the frequency applied to the flexural acoustic wave generator. In FIG. 14, straight lines 71, 72 and 73 represent the center wavelength of filter 10 resulting from the coupling of a core mode with three different cladding modes.

Referring to FIG. 14, there are three applied frequencies for any one optical wavelength in this case. Therefore the input signal light is converted to a plurality of cladding modes by applying multi-frequency electric signal to acoustic wave generator 24. Moreover, it means transmission characteristics of filter 10 can be electrically controlled by adjusting the amplitude and each frequency component of the electric signal.

Figure 15B:
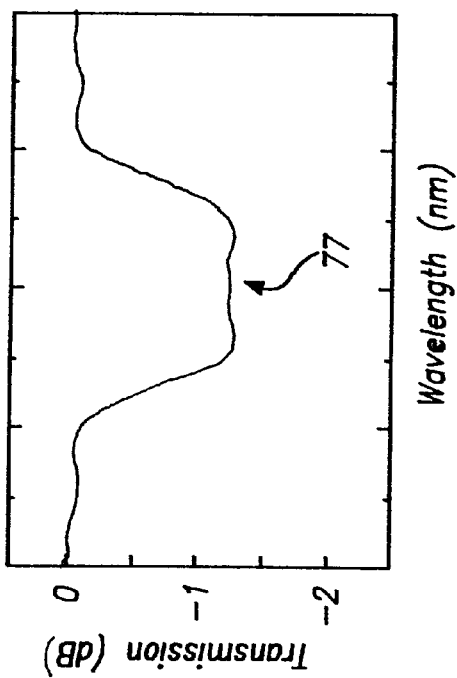
FIGS. 15(a)–(d) are graphs illustrating the transmissions of the filter of FIG. 11 when multiple frequencies are applied to the acoustic wave generator.
Figure 15A:
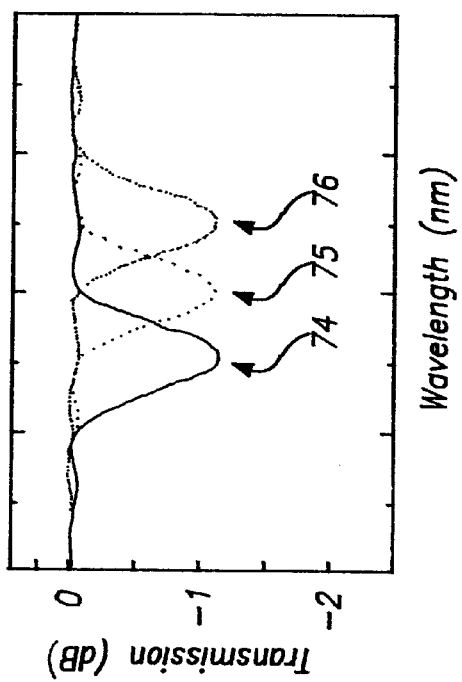
Figure 15D:
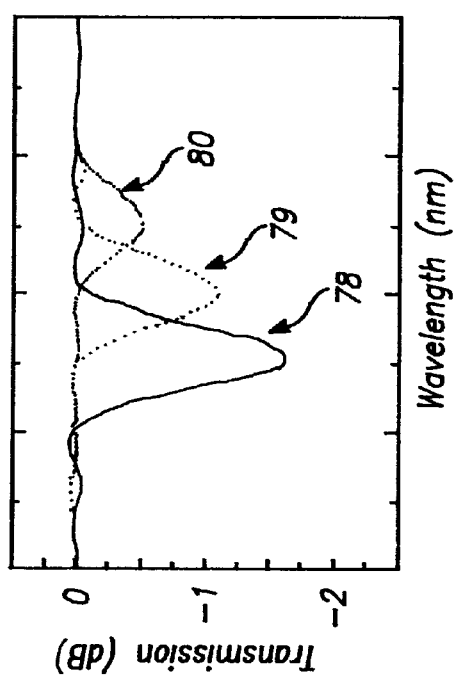
Figure 15C:
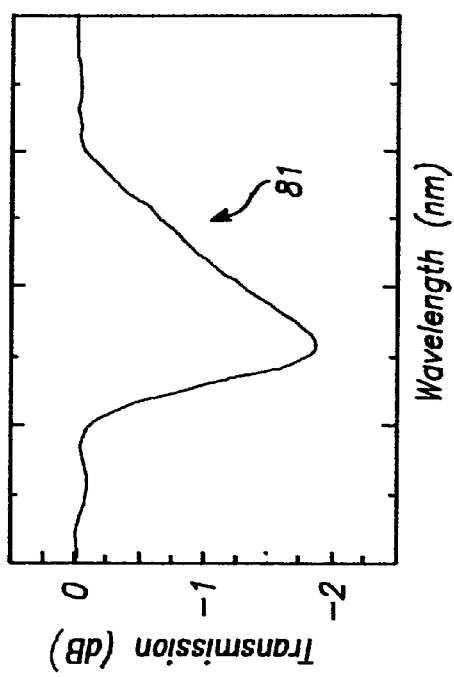

As shown in FIG. 15(a), the respective transmission features 74, 75 and 76 of filter 10 can be provided by applied electric signals with different frequencies f1, f2 and f3. In this example, assuming that f1 couples the core mode of input signal light to a cladding mode (cladding mode A), f2 couples the core mode to other cladding mode (cladding mode B) and f3 couples the core mode to another cladding mode different from A or B (cladding mode C, the transmission feature is shown in FIG. 15(b) as a curve 77 when electric signal with three frequency components f1, f2 and S is applied to acoustic wave generator 24.

As shown in FIG. 5(c), if filter 10 has transmission feature curves 78, 79 and 80 corresponding to respective frequencies f1', f2' and f3' and electric signal having three frequency components f1', f2' and f3' is applied to the flexural acoustic wave generator, the transmission feature of filter 10 is shown as a curve 81 of FIG. 5(d).

FIGS. 16(a) and 16(b) are graphs showing the transmittance of filter 10 according to an embodiment of the present invention, when varying electric signal having three frequency components is applied to filter 10. When varying electric signal having a plurality of frequency components is applied to acoustic wave generator 24 various shapes of transmittance curves 82, 83 and 84 can be obtained.

Since conventional tunable wavelength filters utilize the coupling of only two modes, the difference between a plurality of applied frequencies naturally becomes small to obtain wide wavelength band filtering feature by applying a plurality of frequencies. In this case, as described under the article "Interchannel Interference in multiwavelength operation of integrated acousto-optical filters and switches" by F. Tian and H. Herman in Journal of Light wave technology 1995, Vol. 13, n 6, pp. 1146–1154, when signal light input to a filter is simultaneously converted into same (polarization) mode by various applied frequency components, the output signal light may undesirably be modulated with frequency corresponding to the difference between the applied frequency components. However, with filter 10 the above problem can be circumvented, because the respective frequency components convert the mode of input light into different cladding modes in filter 10.

Figure 17A:
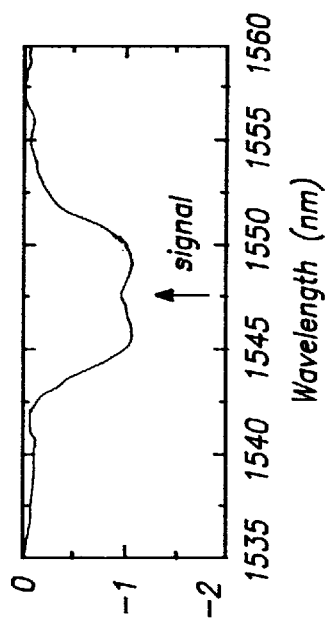
FIGS. 17(a)–(d) are graphs for comparing the mode converting characteristic of the filter according to an embodiment of the present invention with that of a conventional wavelength filter.
Figure 17B:
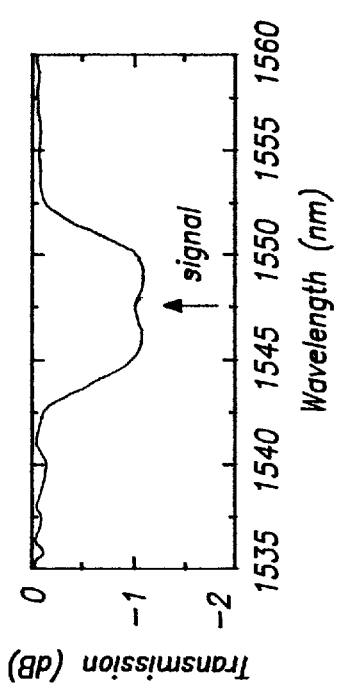

In one embodiment, the filtering feature shown in FIG. 17(a) was obtained by applying adjacent frequencies 2.239 MHz and 2.220 MHz to reproduce the result of a conventional method. The applied two frequencies were such that convert the mode of input light into the same cladding mode. Under the condition, narrow wavelength-band signal light with a center wavelength of 1547 nm was input to filter 10 to measure output light. Referring to the measurement result shown in FIG. 17(b), there is an undesirable modulated signal with frequency corresponding to the difference of the two applied frequencies.

Figure 17C:
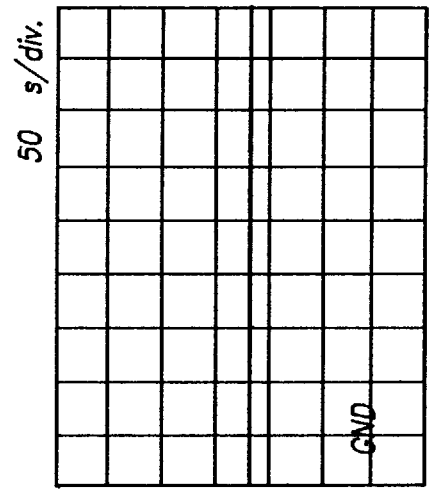

In another embodiment, when adjacent frequencies 2.239 MHz and 2.220 MHz were applied to acoustic wave generator 24, according to the embodiment of the invention, the two frequency components convert the mode of input light into mutually different cladding modes. FIG. 17(c) shows the measurement result when the same signal light as the above experiment was input to filter 10 and output light was measured.

Figure 17D:
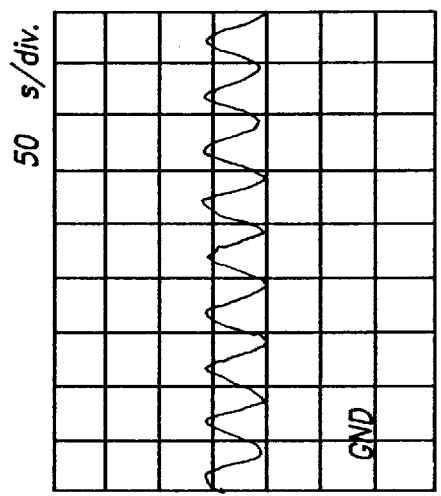

However, an undesirable modulated signal, which appeared in a conventional filter, practically disappeared as shown in FIG. 17(d).

In optical communications or optical fiber sensor systems, wavelength filters are required that has a wide tuning range and are capable of electrically controlling its filtering feature.

FIG. 18(a) illustrates one embodiment of a transmission spectrum of filter 10 with a 15.5-cm-long interaction length for a broadband unpolarized input light from a LED. A conventional communication fiber was used with a nominal core diameter of 8.5 $\mu$m, a cladding outer diameter of 125 $\mu$m and a normalized index difference of 0.37%. The frequency of the applied RF signal was 2.33 MHz, and the corresponding acoustic wavelength was estimated to be ~650 $\mu$m. The three notches shown in FIG. 8(a) are from the coupling to three different cladding modes with the same beat length at the corresponding wavelengths. The coupled cladding modes were the $LP_{11}^{(cl)}$, the $LP_{12}^{(cl)}$, and the $LP_{13}^{(cl)}$ modes, which was confirmed from far-field radiation patterns. The center of each coupling wavelength was tunable over >100 nm by tuning the acoustic frequency.

FIG. 18(b) shows the measured and the calculated center wavelengths of the notches as a function of acoustic frequency. The fiber parameters used in the calculation for best fit with the experimental results are a core diameter of 8.82 $\mu$m, a cladding outer diameter of 125 $\mu$m, and a normalized index difference of 0.324%, in reasonable agreement with the experimental fiber parameters.

Referring again to FIG. 8(a), coupling light of a given wavelength from the fundamental mode to different cladding modes requires acoustic frequencies that are separated from each other by a few hundred kilohertz. This separation is large enough to provide a wide wavelength-tuning range of almost 50 nm for each coupling mode pair without significant overlap with each other, thereby practically eliminating the coherent cross talk that is present in conventional counterparts. The tuning range is sufficient to cover the bandwidth of typical EDFA's. In one embodiment, filter 10 provides for a combination of independent tunable notch filters built into one device, and the number of involved cladding modes corresponds to the umber of filters. The multifrequency acoustic signals can be generated by a single transducer, and the spectral profile of filter 10 is determined by the frequencies and amplitudes of the multiple acoustic signals.

FIG. 19 shows two examples of the configurable spectral profiles with spectral tilt, which can be used to recover the gain flatness in an EDFA with a gain tilt caused by signal saturation. In one embodiment, three cladding modes [$LP_{11}^{(cl)}$, the $LP_{12}^{(cl)}$, and the $LP_{13}^{(cl)}$] were used and three RF signals were simultaneously applied with different voltages and frequencies adjusted for the particular profile. The 3-dB bandwidth of the individual notch was ~6 nm with a 10-cm-long interaction length.

A complex filter profile is required to flatten an uneven EDFA gain, which exhibits large peaks with different widths around 1530 and 1560 nm. The combination of three Gaussian shaped passive filters can produce a flat gain over a 30-nm wavelength range.

Figure 20A:
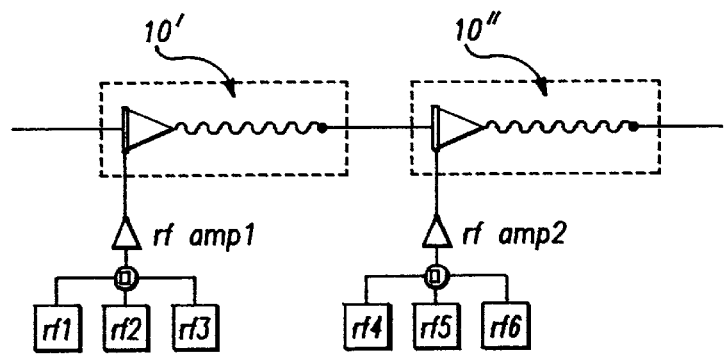
FIG. 20(a) is a filter assembly that includes two filters of FIG. 11 that are in series.

As illustrated in FIG. 20(a), a filter assembly 12 of the present invention can include first and second filters 10' and 10" in series. Each filter 10' and 10" is driven by three radio frequency (RF) signals at different frequencies and amplitudes that produce acousto-optic mode conversion from the fundamental mode to different cladding modes. This approach eliminates the detrimental coherent crosstalk present in LiNbO$_3$-based AOTF's. The 3-dB bandwidths of the first filter 10' were 3.3, 4.1, and 4.9 nm for the couplings to the cladding modes $LP_{12}^{(cl)}$, the $LP_{13}^{(cl)}$, and $LP_{14}^{(cl)}$, respectively. For second filter 10", they were 8, 8.6, and 14.5 nm for the couplings to the cladding modes, $LP_{11}^{(cl)}$, the $LP_{12}^{(cl)}$, and the $LP_{13}^{(cl)}$ respectively.

The minimum separations of notches produced by single RF driving frequency were ~50 nm for first filter 10' and ~150 nm for second filter 10", respectively, so that only one notch for each driving frequency falls into the gain-flattening range (35 nm). The large difference between filters 10' and 10" was due to the difference in optical fiber 12 outer diameters. The polarization splitting in the center wavelength of the notches as ~0.2 nm for first filter 10' and ~1.5 nm for second filter 10". The relatively large polarization dependence in second filter 10" is due mainly due to the unwanted core elliptically and residual thermal stress in optical fiber 12, that can be reduced to a negligible level by using a proper optical fiber. First and second filters 10' and 10" were used for the control of the EDFA gain shape around the wavelengths of 1530 and 1555 nm, respectively. The background loss of the gain flattening AOTF was less than 0.5 dB, which was mainly due to splicing of different single-mode fibers used in the two AOTF's 1010. Adjusting the frequencies and voltages of the applied RF signals provided control of the positions and depths of the notches with great flexibility. The RF's were in the range between 1 and 3 MHz.

Figure 20B:
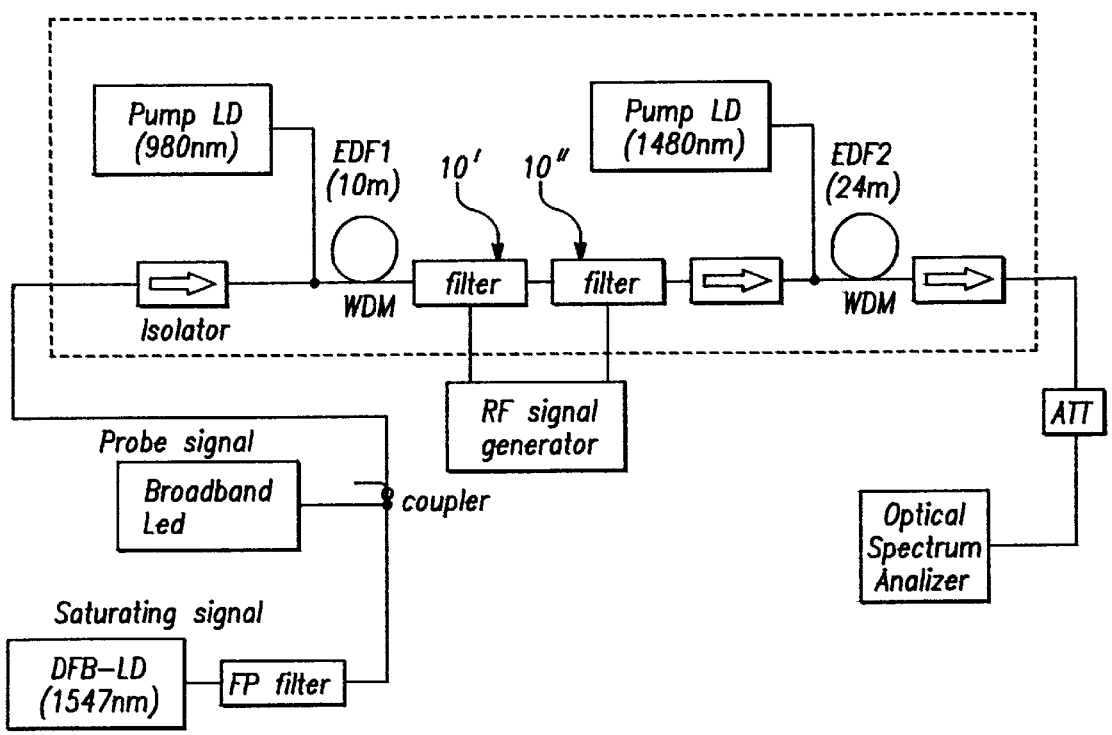
FIG. 20(b) is a schematic diagram of a dual-stage EDFA with a filter of FIG. 20(a).

FIG. 20(b) shows a schematic of a dual-stage EDFA employing gain flattening filter 10 along with a test setup. A 10-m-long EDF pumped by a 980-nm laser diode and a 24-m-long EDF pumped by a 1480-nm laser diode were used as the first and the second stage amplifiers, respectively. The peak absorption coefficients of both EDF's were ~2.5 dB/m at 1530 nm. Filter 10 was inserted between the two stages along with an isolator. Total insertion loss of filter 10 and the isolator was less than 0.9 dB. Six synthesizers and two RF power amplifiers were used to drive filter 10.

Gain profiles of the EDFA were measured using a saturating signal at the wavelength of 1547.4 nm and a broadband light-emitting diode (LED) probing signal. The saturating signal from a distributed feedback (DFB) laser diode was launched into the EDFA after passing through a Fabry-Perot filter (optical bandwidth: 3 GHz, extinction ratio: 27 dB) to suppress the sidelobes of the laser diode. The total power of the probe signal in 1520–1570-nm range was 27 dBm, which is much smaller than that of the input saturating signal ranging from 13 to 7 dBm.

FIG. 21(a) shows gain profiles before and after the gain flattening for two different saturating signal powers of 13 and 7 dBm when the second-stage pump power was 42 mW. The gain excursions before flattening were larger than 5 dB. By adjusting the filter profile, flat gain profiles within 0.7 dB were obtained over 35 nm for both cases. The flat gain region is shifted slightly toward the shorter wavelength for higher gain level, which is due to the intrinsic gain characteristics of the EDF. FIG. 21(b) shows filter profiles that produced the flat gain profiles shown in FIG. 21(a), where Profile 1 and Profile 2 are for the cases of saturating tones of 13 and 7 dBm, respectively. For the measurements, EDFI was used as an ASE source, while the second pump diode (1480 nm) was turned off. The ASE signal leaked out of the second WDM coupler was monitored and the signals obtained when the filter was on and off were compared to yield the filter response. The attenuation coefficients for Profile 1 and Profile 2 at the saturating signal wavelength were 5.0 and 4.9 dB, respectively, and the average attenuation over the 35-nm range (1528–1563 nm) was 5 dB in both cases. The total RF electrical power consumption of the filter was less than 500 mW. Profile 2 could be obtained from Profile 1 by adjusting mainly the depths of notches, although fine adjustments of center wavelengths of notches within 0.5-nm range slightly improved the gain flatness. FIG. 21(c) shows the filter profiles of first filter 10' and second filter 10" used to form Profile 1, and also the locations of center wavelengths of six notches. By adjusting first and second filters 10' and 10" spectral profiles electronically gain flatness of <0.7 dB over 35-nm wavelength range were obtained at various levels of gain as well as input signal and pump power.

One important characteristic of filter 10 is polarization dependence. The shape of filter 10 can be dependent on the polarization state of input light. The polarization dependence originates from fiber birefringence. Fiber birefringence causes the effective propagation constant of a mode to be different between two eigen polarization states. Since the magnitude of birefringence is different from mode to mode, the fiber birefringence causes the beat length between two coupled modes to be different between the eigen polarization states, and, therefore, results in splitting of center wavelength of filter 10 for a given acoustic frequency.

Figure 22A:
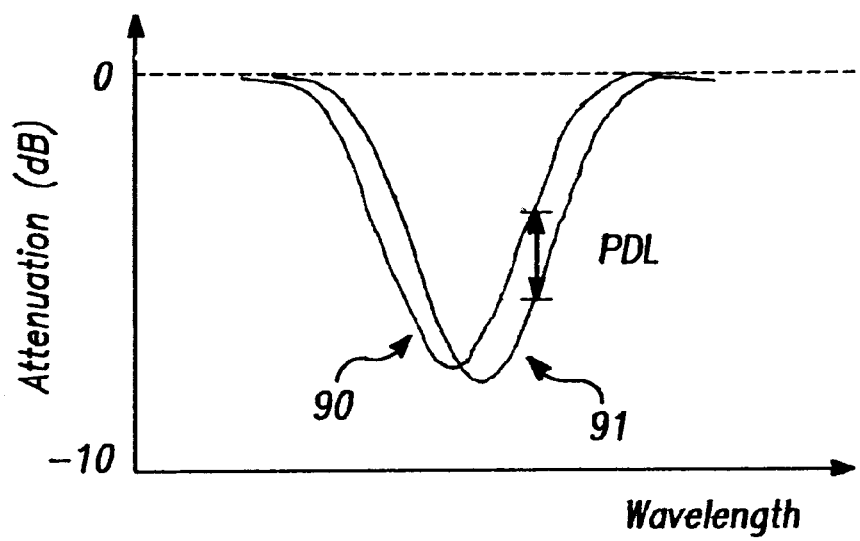
FIGS. 22(a) and 22(b) are graphs illustrating the polarization dependence of the filter of one embodiment of the filter of the present invention.

FIG. 22(a) illustrates the polarization dependence. Curve 90 represents the filter profile for light in one eigen polarization state, and filter profile 92 is when the input is in the other eigen state. The center wavelengths are split because of the birefringence. Moreover, since the field overlap between two coupled modes is also polarization dependent due to the birefringence, the attenuation depth can be different between filter profiles 90 and 92.

Figure 22B:
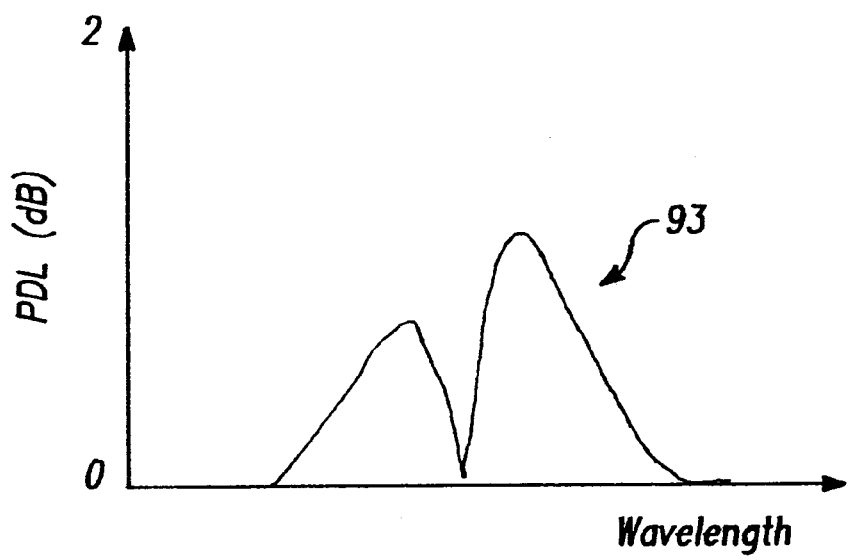

A critical feature due to the polarization dependence is the polarization dependent loss (PDL) which is defined as the difference of the magnitude of attenuation between two eigen polarization states. Since polarization dependent loss is an absolute value, it increases with the attenuation depth. FIG. 22(b) shows polarization dependent loss profile 93 associated with filter profiles 90 and 92. In WDM communication system applications, the polarization dependent loss should be minimized. Most applications require the polarization dependent loss to be less than 0.1 dB. However, acousto-optic tunable filter 10 has exhibited a typical polarization dependent loss as large as 2 dB at 10-dB attenuation level. This is due to the large birefringence of the antisymmetric cladding modes.

FIG. 23 shows one possible configuration that can reduce the inherent polarization dependent loss of filter 10. In FIG. 23, double-pass filter 100 consists of a 3-port circulator with input-, middle-, and output-port fibers, 12', 12" and 12''', respectively, and Faraday rotating mirror (FRM) 104. The middle-port fiber 12" is connected to acousto-optic tunable filter 10 and Faraday rotating mirror 104. When light comes in through input-port fiber 12', it is directed to filter 10, through circulator 102, and then refracted by Faraday rotating mirror 104. Faraday rotating mirror 104 acts as a conjugate mirror with respect to optical polarization states. So, if the light pass through filter 10 in a specific polarization state, then on the way back after reflection it pass through filter 10 in its orthogonal polarization state. Since the light pass through filter 10 twice but in mutually orthogonal states, the total attenuation after the double pass becomes polarization-insensitive. Another benefit of the double pass configuration is that, since the filtering takes place twice in filter 10, the drive RF power applied to filter 10 to obtain a certain attenuation depth is reduced half compared to single-pass configuration as in FIG. 4. For instance, when filter 10 is operated at an attenuation depth of 5 dB, the overall attenuation depth of double-pass filter 100 becomes 10 dB.

Another embodiment of a device configuration for low polarization dependence is shown in FIG. 24. In this embodiment, dual filter 110 consists of filters 10' and 10" in tandem and connected through mid fiber section 112. Filters 10' and 10" are preferably operated at the same RF frequency. The birefringence of mid fiber section 112 is adjusted such that it acts as a half-wave plate aligned with 45-degree angle with respect to the eigen polarization axes of filters 10' and 10". In other words, the light passing through filter 10' in one eigen polarization state enters filter 10" in the other eigen polarization state. If the polarization dependent loss is the same loss for filters 10' and 10", the overall attenuation after passing through filters 10' and 10" becomes polarization-insensitive. If filters 10' and 10" are not identical in terms of polarization dependent loss, the double filter 110 would exhibit residual polarization dependent loss that should be, however, smaller than the polarization dependent loss of individual filters, 10' or 10". Therefore, it is desirable that filters 10' and 10" are identical devices. Since the filtering takes place by two filters, the drive powers to individual filters are reduced, compared to using a single filter alone, to achieve the same attenuation depth.

In one embodiment, illustrated in FIG. 23, circulator 102 based on magneto-optic crystal has overall insertion loss and polarization dependent loss of 1.5 dB and 0.5 dB, respectively. Faraday rotating mirror 104 has insertion loss and polarization dependent loss of 0.5 dB and 0.5 dB, respectively. Curve 120 in FIG. 24(*a*) shows the polarization dependent loss profile in one embodiment when filter 10 was operated to produce 10-dB attenuation at 1550 nm. The filter profile in this instance is shown by curve 124 in FIG. 24(*b*). Optical fiber 12 used in the filter was a conventional communication-grade single mode fiber. When the filter was used in the double-pass configuration, the overall polarization dependent loss was reduced greatly as shown by curve 121 in FIG. 24(*a*).

The polarization dependent loss was reduced down to less than 0.2 dB. The total insertion loss of double-pass filter was 3 dB, mainly due to the circulator and splices. In this embodiment, the drive power to filter 10 required to produce total 10-dB attenuation at 1550 nm, as shown by filter profile 125 in FIG. 24(*b*), was decreased compared to the single-pass filter experiment.

Figure 25:
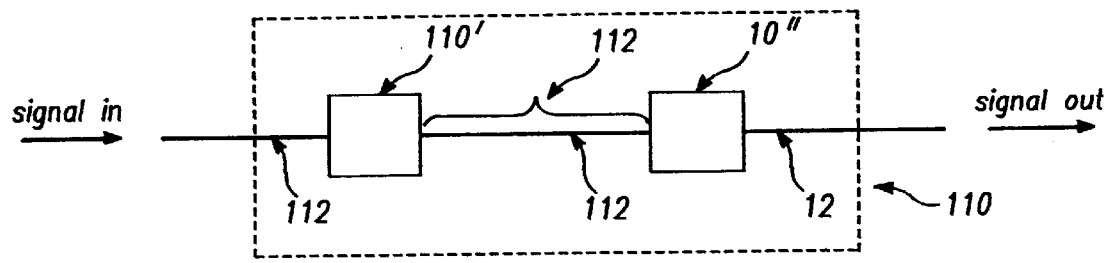
FIG. 25 illustrates an embodiment of the invention with two of the filters of FIG. 1.

In another embodiment, illustrated in FIG. 25, two filters were fabricated with a conventional circular-core single mode fiber. Each filter was operated with 5-dB attenuation at the same center wavelength, 1550 nm. The overall dual filter profile is shown by curve 126 in FIG. 24(*b*). In these filters, the eigen polarization states are linear and their axes are parallel and orthogonal to the direction of the flexural acoustic wave vibration or the acoustic polarization axis. This is generally true with filters made of a circular-core fiber where the dominant birefringence axes are determined by the lobe orientation of the cladding mode, which is the same as the acoustic polarization axis. Linear axis orthogonal to acoustic polarization is the slow axis, and its orthogonal axis is the fast axis. In this embodiment, a polarization controller was used in mid fiber section 112 and controlled to minimize the overall polarization dependent loss of dual filter 110.

The loss profile is shown by curve 122 in FIG. 24(*a*). The total filter profile is shown by curve 126 in FIG. 24(*b*). The residual polarization dependent loss as large as 0.6 dB is primarily due to different polarization dependent loss of filters 10' and 10", and could be reduced greatly if identical two filters were used.

Figure 26:
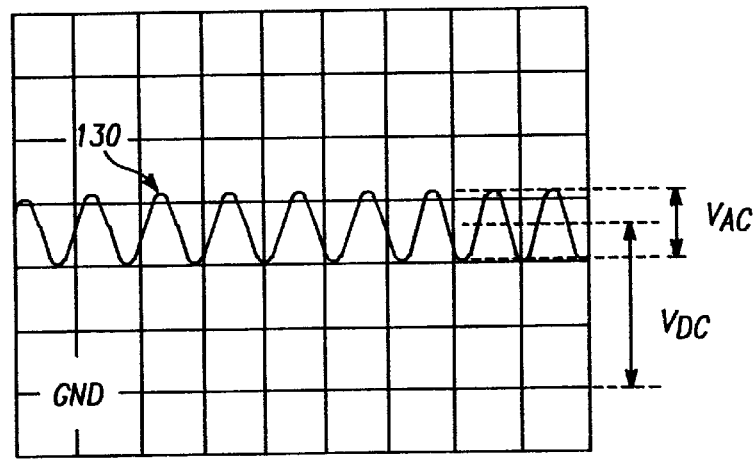
FIG. 26 is a graph illustrating the effects of a backward acoustic reflection at the damper of one embodiment of the present invention from FIG. 4.

Another important characteristic of filter 10 is the intensity modulation of an optical signal passing through the filter. One reason which gives rise to the intensity modulation of the output signal is static coupling between the core and cladding modes either by microbending of fiber 12 or imperfect splices, if present. Another reason is an acoustic wave propagating backward in interactive region 36 by an acoustic reflection at imperfect acoustic damper 30 and fiber jacket 32. FIG. 26 shows an example of output signal 139 suffering from the intensity modulation by backward acoustic reflection at acoustic damper 30. In this case, the major modulation frequency is equal to twice the acoustic frequency. The modulation depth is defined by the ratio of peak-to-peak AC voltage amplitude, $V_{AC}$ to DC voltage, $V_{DC}$. By static mode coupling, the major modulation frequency is equal to the acoustic frequency. When both static mode coupling and backward acoustic wave are present, the intensity of the output is modulated at frequencies of both first- and second-harmonics of the acoustic frequency. The modulation depth, when smaller than 20%, is, approximately, linearly proportional to the amount of attenuation in dB scale. In most WDM communication system applications, the modulation depth is generally required to be less than 3% at 10-dB attenuation level.

In one embodiment, illustrated in FIG. 4, filter 10 was fabricated by using a conventional single-mode fiber. The modulation depth at 10-dB attenuation level was about 10% at both first- and second-harmonics of the acoustic frequency, as shown by curves 140 and 141 in FIG. 27(*a*), respectively. The same filter was used as filter 10 in another embodiment, illustrated in FIG. 23. The RF drive power to the filter was controlled to produce 10-dB attenuation depth. In the first embodiment of double-pass filter 100, the length of fiber section 106 was selected such that the round-trip travel time of fiber section 106 is equal to a quarter of the period of the acoustic wave. In this case, the second-harmonics component of the intensity modulation can be compensated out. Curves 142 and 143 in FIG. 27(*a*) show the modulation depth of first- and second-harmonics components, respectively. The second-harmonics was eliminated almost completely. The first-harmonics was also reduced a little, which may be attributed to imperfect length matching of fiber section 106. In the second embodiment of double-pass filter 100, the length of fiber section 106 was such that the optical round-trip travel time of fiber section 106 is equal to a half of the period of the acoustic wave. In this case, the first-harmonics component of the intensity modulation can be reduced. Curves 147 and 148 in FIG. 27(*b*) show the modulation depth of first- and second-harmonics components, respectively. The first-harmonics was eliminated almost completely.

Reduction of intensity modulation can also be achieved by dual filter 110 where the length of mid fiber section 112 is selected properly. For example, if the first-harmonic modulation component is to be compensated, the length of mid fiber section 112 is such that the optical travel time from one end of section 112 to the other end is equal to a half of the period of the acoustic wave.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An acousto-optic apparatus, comprising:
   an optical fiber with a longitudinal axis, a core and a cladding in a surrounding relationship to the core, the optical fiber having multiple cladding modes and a single core mode guided along the core;
   an acoustic wave propagation member with a proximal end and a distal end, the distal end being coupled to the optical fiber, the acoustic wave propagation member propagating an acoustic wave from the proximal to the distal end and launch an acoustic wave in the optical fiber; and at least one acoustic wave generator coupled to the proximal end of the acoustic wave propagation member, wherein a wavelength of an optical signal coupled to the cladding from the core is changed by varying the frequency of a signal applied to the acoustic wave generator.

2. The apparatus of claim 1, wherein the acoustic wave generator produces multiple acoustic signals with individual controllable strengths and frequencies and each of the acoustic signals provides a coupling between the core mode and a different cladding mode.

3. The apparatus of claim 1, wherein a length of the optical fiber is no greater than 1 meter.

4. The apparatus of claim 1, wherein the acoustic wave generator is a shear transducer.

5. The apparatus of claim 1, wherein the acoustic wave generator produces multiple acoustic signals with individual controllable strengths and frequencies and each of the acoustic signals provides a coupling between the core mode and a different cladding mode.

6. The apparatus of claim 1, wherein the optical fiber provides fundamental and cladding mode propagation.

7. The apparatus of claim 1, wherein the acoustic wave propagation member is mechanically coupled to the optical fiber to create a lower order mode flexure wave in the optical fiber.

8. The apparatus of claim 1, wherein the acoustic wave propagation member is mechanically coupled to the optical fiber and maximizes acoustic energy in the optical fiber.

9. The apparatus of claim 1, wherein the acoustic wave propagation member is coupled to the optical fiber to match a generation of modes carried by the optical fiber.

10. The apparatus of claim 1, wherein the optical fiber is tensioned.

11. The apparatus of claim 1, wherein the optical fiber is sufficiently tensioned to reduce losses in the flexure wave.

12. The apparatus of claim 1, wherein the acoustic wave propagation member has an elongated geometric configuration.

13. The apparatus of claim 1, wherein the acoustic wave propagation member is tapered from the proximal to the distal ends.

14. The apparatus of claim 1, wherein the acoustic wave propagation member has a conical geometric configuration.

15. The apparatus of claim 1, wherein the acoustic wave propagation member has a longitudinal axis that is parallel to the longitudinal axis of the optical fiber.

16. The apparatus of claim 1, wherein the acoustic wave propagation member includes an interior with an optical fiber receiving channel.

17. The apparatus of claim 1, wherein the optical fiber receiving channel is a capillary channel.

18. The apparatus of claim 16, wherein the interior of the acoustic wave propagation member is solid.

19. The apparatus of claim 1, wherein the acoustic wave propagation member is a unitary structure.

20. The apparatus of claim 1, wherein the acoustic wave propagation member is directly coupled to the optical fiber.

21. The apparatus of claim 1, further comprising:
a coupling member that couples the acoustic wave propagation member to the optical fiber.

22. The apparatus of claim 21, wherein the coupling member includes a bonding material.

23. The apparatus of claim 1, wherein an interface between the acoustic wave propagation member and the optical fiber is mechanically rigid.

24. The apparatus of claim 1, wherein at exterior surface of the acoustic wave propagation member is polished.

25. The apparatus of claim 1, wherein the interface between the acoustic wave propagation member and the optical fiber is sufficiently mechanically rigid to minimize back reflections of the acoustic wave from the optical fiber to the acoustic wave propagation member.

26. The apparatus of claim 1, wherein the acoustic wave generator includes a piezoelectric material.

27. The apparatus of claim 26, wherein the acoustic wave generator is coupled to an RF signal generator.

28. The apparatus of claim 26, wherein the acoustic wave generator has a mechanical resonance at a frequency in the range of 1–20 MHz.

29. The apparatus of claims, wherein the acoustic wave creates a periodic microbend structure in the optical fiber.

30. The apparatus of claim 26, wherein the periodic microbend structure couples light in the fiber from a core mode to a cladding mode.

31. The apparatus of claim 1, further comprising:
an acoustic damper coupled to the optical fiber.

32. The apparatus of claim 31, wherein the acoustic damper includes a jacketing material positioned in a surrounding relationship to the optical fiber.

33. The apparatus of claim 31, wherein a proximal end of the acoustic damper is tapered.

34. An acousto-optic apparatus, comprising:
an optical fiber with a longitudinal axis, a core and a cladding in a surrounding relationship to the core, the optical fiber having multiple cladding modes and a single core mode guided along the core;

an acoustic wave propagation member with a proximal end and a distal end, the distal end being coupled to the optical fiber, the acoustic wave propagation member propagating an acoustic wave from the proximal to the distal end and launch an acoustic wave in the optical fiber;

at least one acoustic wave generator coupled to the proximal end of the acoustic wave propagation member, wherein a wavelength of an optical signal coupled to the cladding from the core is changed by varying the frequency of a signal applied to the acoustic wave generator; and a heatsink with a proximal face and a distal face that is coupled to the acoustic wave generator, wherein the acoustic wave generator is positioned between the acoustic wave propagation member and the heatsink.

35. The apparatus of claim 34, wherein the acoustic wave generator produces multiple acoustic signals with individual controllable strengths and frequencies and each of the acoustic signals provides a coupling between the core mode and a different cladding mode.

36. The apparatus of claim 34, wherein a length of the optical fiber is no greater than 1 meter.

37. The apparatus of claim 34, wherein the acoustic wave generator is a shear transducer.

38. The apparatus of claim 34, wherein the acoustic wave generator produces multiple acoustic signals with individual controllable strengths and frequencies and each of the acoustic signals provides a coupling between the core mode and a different cladding mode.

39. The apparatus of claim 34, wherein the acoustic wave generator includes a piezoelectric material.

40. The apparatus of claim 34, wherein the heatsink provides a mount for the acoustic wave generator.

41. The apparatus of claim 34, wherein the heatsink is made of a material with a high heat conductivity and a low acoustic impedance.

42. The apparatus of claim 34, wherein an acoustic reflectivity and size of the heatsink is selected to provide a launching efficiency of the acoustic wave into the optical fiber independent of an RF frequency applied to the acoustic wave generator.

43. The apparatus of claim 34, wherein the proximal face of the heatsink has a slant surface.

44. The apparatus of claim 34, further comprising:
an acoustic wave reflective member positioned at the proximal face of the heatsink.

45. The apparatus of claim 34, wherein a thickness of the heatsink is selected to provide a travel time of an acoustic wave in the heatsink from its distal face to its proximal face, and from its proximal face to its distal face, that substantially matches a travel time of the acoustic wave traveling through the acoustic wave propagation member from its proximal end to its distal end, and from its distal end to its proximal end.

46. The apparatus of claim 34, further comprising:
a coupling member positioned between the heatsink and the acoustic wave generator.

47. The apparatus of claim 46, wherein the coupling member includes a bonding material.

48. The apparatus of claim 47, wherein the bonding material is a thermally conductive material.

49. An optical communication system, comprising:
a transmitter;
an acoustic-optic apparatus coupled to the transmitter, the acoustic-optic apparatus including, an optical fiber with a longitudinal axis, a core and a cladding in a surrounding relationship to the core, the optical fiber having multiple cladding modes and a single core mode guided along the core; an acoustic wave propagation member with a proximal end and a distal end, the distal end being coupled to the optical fiber, the acoustic wave propagation member propagating an acoustic wave from the proximal to the distal end and launch an acoustic wave in the optical fiber; and
at least one acoustic wave generator coupled to the proximal end of the acoustic wave propagation member, wherein a wavelength of an optical signal coupled to the cladding from the core is changed by varying the frequency of a signal applied to the acoustic wave generator; and
a receiver coupled to the acoustic-optic apparatus.

50. The system of claim 49, wherein the optical fiber is a non-birefringent single mode optical fiber.

51. An optical communication system, comprising:
a transmitter including an acoustic-optic apparatus that has a single mode optical fiber with a longitudinal axis, a core and a cladding in a surrounding relationship to the core, the optical fiber having multiple cladding modes and a single core mode guided along the core, an acoustic wave propagation member with a proximal end and a distal end, the distal end being coupled to the optical fiber, the acoustic wave propagation member propagating an acoustic wave from the proximal to the distal end and launch an acoustic wave in the optical fiber, and at least one acoustic wave generator coupled to the proximal end of the acoustic wave propagation member, wherein a wavelength of an optical signal coupled to the cladding from the core is changed by varying the frequency of a signal applied to the acoustic wave generator; and
a receiver coupled to the transmitter.

52. The system of claim 51, wherein the optical fiber is a non-birefringent single mode optical fiber.

53. An optical communication system, comprising:
a transmitter; and
a receiver including an acoustic-optic apparatus that has a single mode optical fiber with a longitudinal axis, a core and a cladding in a surrounding relationship to the core, the optical fiber having multiple cladding modes and a single core mode guided along the core, an acoustic wave propagation member with a proximal end and a distal end, the distal end being coupled to the optical fiber, the acoustic wave propagation member propagating an acoustic wave from the proximal to the distal end and launch an acoustic wave in the optical fiber, and at least one acoustic wave generator coupled to the proximal end of the acoustic wave propagation member, wherein a wavelength of an optical signal coupled to the cladding from the core is changed by varying the frequency of a signal applied to the acoustic wave generator.

54. The system of claim 53, wherein the optical fiber is a non birefringent single mode optical fiber.

55. An optical communication device, comprising:
a first acousto-optic apparatus including a first optical fiber with a longitudinal axis, a core and a cladding in a surrounding relationship to the core, the first optical fiber having multiple cladding modes and a single core mode guided along the core, a first acoustic wave propagation member with a proximal end and a distal end, the distal end being coupled to the first optical fiber, the first acoustic wave propagation member propagating a first acoustic wave from the proximal to the distal end and launch a first acoustic wave in the first optical fiber, the first acousto-optic apparatus including a first acoustic wave generator coupled to the proximal end of the first acoustic wave propagation member, wherein a wavelength of an optical signal coupled to the cladding from the core is changed by varying the frequency of a signal applied to the first acoustic wave generator; and
a second acousto-optic apparatus coupled to the first acousto-optic apparatus, the second acousto-optic apparatus including a second acoustic wave propagation member with a proximal end and a distal end, the distal end being coupled to the first optical fiber, the second acoustic wave propagation member propagating a second acoustic wave from the proximal to the distal end and launch a second acoustic wave in the first optical fiber, the second acousto-optic apparatus including a second acoustic wave generator coupled to the proximal end of the second acoustic wave propagation member, wherein a wavelength of an optical signal coupled to the cladding from the core is changed by varying the frequency of a signal applied to the second acoustic wave generator.

56. An acousto-optic apparatus, comprising:
an optical fiber with a longitudinal axis, a core and a cladding in a surrounding relationship to the core, the optical fiber having multiple cladding modes and a single core mode guided along the core;
an acoustic wave propagation member with a proximal end and a distal end, the distal end being coupled to the optical fiber, the acoustic wave propagation member propagating an acoustic wave from the proximal to the distal end and launch an acoustic wave in the optical fiber; and
at least one acoustic wave generator coupled to the proximal end of the acoustic wave propagation member, wherein an amount of an optical signal coupled to the cladding from the core is changed by varying an amplitude of a signal applied to the acoustic wave generator.

57. The apparatus of claim 56, wherein the acoustic wave generator produces multiple acoustic signals with individual controllable strengths and frequencies and each of the acoustic signals provides a coupling between the core mode and a different cladding mode.

58. The apparatus of claim 56, wherein a length of the optical fiber is no greater than 1 meter.

59. The apparatus of claim 56, wherein the acoustic wave generator is a shear transducer.

60. The apparatus of claim 56, wherein the acoustic wave generator produces multiple acoustic signals with individual controllable strengths and frequencies and each of the acoustic signals provides a coupling between the core mode and a different cladding mode.

61. The apparatus of claim 56, wherein the optical fiber provides fundamental and cladding mode propagation.

62. The apparatus of claim 56, wherein the acoustic wave propagation member is mechanically coupled to the optical fiber to create a lower order mode flexure wave in the optical fiber.

63. The apparatus of claim 56, wherein the acoustic wave propagation member is mechanically coupled to the optical fiber and maximizes acoustic energy in the optical fiber.

64. The apparatus of claim 56, wherein the acoustic wave propagation member is coupled to the optical fiber to match a generation of modes carried by the optical fiber.

65. The apparatus of claim 56, wherein the optical fiber is tensioned.

66. The apparatus of claim 56, wherein the optical fiber is sufficiently tensioned to reduce losses in the flexure wave.

67. The apparatus of claim 56, wherein the acoustic wave propagation member has an elongated geometric configuration.

68. The apparatus of claim 56, wherein the acoustic wave propagation member is tapered from the proximal to the distal ends.

69. The apparatus of claim 56, wherein the acoustic wave propagation member has a conical geometric configuration.

70. The apparatus of claim 56, wherein the acoustic wave propagation member has a longitudinal axis that is parallel to the longitudinal axis of the optical fiber.

71. The apparatus of claim 56, wherein the acoustic wave propagation member includes an interior with an optical fiber receiving channel.

72. The apparatus of claim 56, wherein the optical fiber receiving channel is a capillary channel.

73. The apparatus of claim 71, wherein the interior of the acoustic wave propagation member is solid.

74. The apparatus of claim 56, wherein the acoustic wave propagation member is a unitary structure.

75. The apparatus of claim 56, wherein the acoustic wave propagation member is directly coupled to the optical fiber.

76. The apparatus of claim 56, further comprising:
a coupling member that couples the acoustic wave propagation member to the optical fiber.

77. The apparatus of claim 76, wherein the coupling member includes a bonding material.

78. The apparatus of claim 56, wherein an interface between the acoustic wave propagation member and the optical fiber is mechanically rigid.

79. The apparatus of claim 56, wherein at exterior surface of the acoustic wave propagation member is polished.

80. The apparatus of claim 56, wherein the interface between the acoustic wave propagation member and the optical fiber is sufficiently mechanically rigid to minimize back reflections of the acoustic wave from the optical fiber to the acoustic wave propagation member.

81. The apparatus of claim 56, wherein the acoustic wave generator includes a piezoelectric material.

82. The apparatus of claim 81, wherein the acoustic wave generator is coupled to an RF signal generator.

83. The apparatus of claim 81, wherein the acoustic wave generator has a mechanical resonance at a frequency in the range of 1–20 MHz.

84. The apparatus of claim 56, wherein the acoustic wave creates a periodic microbend structure in the optical fiber.

85. The apparatus of claim 81, wherein the periodic microbend structure couples light in the fiber from a core mode to a cladding mode.

86. The apparatus of claim 56, further comprising:
an acoustic damper coupled to the optical fiber.

87. The apparatus of claim 86, wherein the acoustic damper includes a jacketing material positioned in a surrounding relationship to the optical fiber.

88. The apparatus of claim 86, wherein a proximal end of the acoustic damper is tapered.

89. An acousto-optic apparatus, comprising:
an optical fiber with a longitudinal axis, a core and a cladding in a surrounding relationship to the core, the optical fiber having multiple cladding modes and a single core mode guided along the core;
an acoustic wave propagation member with a proximal end and a distal end, the distal end being coupled to the optical fiber, the acoustic wave propagation member propagating an acoustic wave from the proximal to the distal end and launch an acoustic wave in the optical fiber;
at least one acoustic wave generator coupled to the proximal end of the acoustic wave propagation member, wherein an amount of an optical signal coupled to the cladding from the core is changed by varying an amplitude of a signal applied to the acoustic wave generator; and
a heatsink with a proximal face and a distal face that is coupled to the acoustic wave generator, wherein the acoustic wave generator is positioned between the acoustic wave propagation member and the heatsink.

90. An optical communication system, comprising:
a transmitter;
an acoustic-optic apparatus coupled to the transmitter, the acoustic-optic apparatus including, an optical fiber with a longitudinal axis, a core and a cladding in a surrounding relationship to the core, the optical fiber having multiple cladding modes and a single core mode guided along the core; an acoustic wave propagation member with a proximal end and a distal end, the distal end being coupled to the optical fiber, the acoustic wave propagation member propagating an acoustic wave from the proximal to the distal end and launch an acoustic wave in the optical fiber; and
at least one acoustic wave generator coupled to the proximal end of the acoustic wave propagation member, wherein an amount of an optical signal coupled to the cladding from the core is changed by varying an amplitude of a signal applied to the acoustic wave generator; and
a receiver coupled to the acoustic-optic apparatus.

91. An optical communication system, comprising:
a transmitter including an acoustic-optic apparatus that has a single mode optical fiber with a longitudinal axis, a core and a cladding in a surrounding relationship to the core, the optical fiber having multiple cladding modes and a single core mode guided along the core, an acoustic wave propagation member with a proximal end and a distal end, the distal end being coupled to the optical fiber, the acoustic wave propagation member propagating an acoustic wave from the proximal to the distal end and launch an acoustic wave in the optical fiber, and at least one acoustic wave generator coupled to the proximal end of the acoustic wave propagation member, wherein an amount of an optical signal coupled to the cladding from the core is changed by varying an amplitude of a signal applied to the acoustic wave generator; and a receiver coupled to the transmitter.

92. An optical communication system, comprising:

a transmitter; and a receiver including an acoustic-optic apparatus that has a single mode optical fiber with a longitudinal axis, a core and a cladding in a surrounding relationship to the core, the optical fiber having multiple cladding modes and a single core mode guided along the core, an acoustic wave propagation member with a proximal end and a distal end, the distal end being coupled to the optical fiber, the acoustic wave propagation member propagating an acoustic wave from the proximal to the distal end and launch an acoustic wave in the optical fiber, and at least one acoustic wave generator coupled to the proximal end of the acoustic wave propagation member, wherein an amount of an optical signal coupled to the cladding from the core is changed by varying an amplitude of a signal applied to the acoustic wave generator.

93. An optical communication device, comprising:

a first acousto-optic apparatus including a first optical fiber with a longitudinal axis, a core and a cladding in a surrounding relationship to the core, the first optical fiber having multiple cladding modes and a single core mode guided along the core, a first acoustic wave propagation member with a proximal end and a distal end, the distal end being coupled to the first optical fiber, the first acoustic wave propagation member propagating a first acoustic wave from the proximal to the distal end and launch a first acoustic wave in the first optical fiber, the first acousto-optic apparatus including a first acoustic wave generator coupled to the proximal end of the first acoustic wave propagation member, wherein a wavelength of an optical signal coupled to the cladding from the core is changed by varying the frequency of a signal applied to the first acoustic wave generator; and a second acousto-optic apparatus coupled to the first acousto-optic apparatus, the second acousto-optic apparatus including a second acoustic wave propagation member with a proximal end and a distal end, the distal end being coupled to the first optical fiber, the second acoustic wave propagation member propagating a second acoustic wave from the proximal to the distal end and launch a second acoustic wave in the first optical fiber, the second acousto-optic apparatus including a second acoustic wave generator coupled to the proximal end of the second acoustic wave propagation member, wherein a wavelength of an optical signal coupled to the cladding from the core is changed by varying the frequency of a signal applied to the second acoustic wave generator.

* * * * *